United States Patent
Kim et al.

(10) Patent No.: US 10,282,333 B2
(45) Date of Patent: May 7, 2019

(54) ELECTRONIC DEVICE OPERATING METHOD AND ELECTRONIC DEVICE FOR SUPPORTING THE SAME

(71) Applicant: Samsung Electronics Co., Ltd., Suwon-si, Gyeonggi-do (KR)

(72) Inventors: Won Seob Kim, Seoul (KR); Eun Seok Hong, Suwon-si (KR); Gyoung Hwan Park, Seoul (KR); Woo Sung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 15/139,760

(22) Filed: Apr. 27, 2016

(65) Prior Publication Data
US 2016/0321206 A1 Nov. 3, 2016

(30) Foreign Application Priority Data

Apr. 28, 2015 (KR) .......................... 10-2015-0059643

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 13/4295* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,903,910 B1 | 6/2005 | Griesing et al. | |
| 7,076,270 B2 | 7/2006 | Jaggers et al. | |
| 7,462,035 B2 | 12/2008 | Lee et al. | |
| 7,556,532 B2 | 7/2009 | Lee et al. | |
| 7,562,159 B2 | 7/2009 | Chen et al. | |

(Continued)

FOREIGN PATENT DOCUMENTS

| | | |
|---|---|---|
| EP | 1626346 A1 | 2/2006 |
| EP | 1705936 A2 | 9/2006 |
| JP | 2009164868 A1 | 7/2009 |

OTHER PUBLICATIONS

Motorola Mobility: "USB cable interference in MIMO OTA measurements", 3GPP Draft; R4-113034, 3rd Generation Partnership Project (3GPP), Mobile Competence Centre; 650, Route Des Lucioles; F-06921 Sophia-Antipolis Cedex; France, vol. RAN WG4, no. Barcelona, Spain; May 9, 2011, May 9, 2011, XP050502834.

*Primary Examiner* — Michael Sun
(74) *Attorney, Agent, or Firm* — Jefferson IP Law, LLP

(57) ABSTRACT

An electronic device is provided. The electronic device includes a memory configured to store at least one instruction associated with a universal serial bus (USB) communication function or a wireless communication function operation, and at least one processor connected to the memory and configured to execute the at least one instruction stored in the memory. When a request for execution of the wireless communication function is received during execution of the USB communication function, the at least one instruction executed by the processor is configured to deactivate the execution of USB communication function in corresponding to a type of the USB communication function.

20 Claims, 15 Drawing Sheets

(56) References Cited

U.S. PATENT DOCUMENTS

| | | |
|---|---|---|
| 7,658,612 B2 | 2/2010 | Lee et al. |
| 7,731,517 B2 | 6/2010 | Lee et al. |
| 7,753,685 B2 | 7/2010 | Lee et al. |
| 7,853,739 B1* | 12/2010 | Kupershmidt ........ G06F 13/102 |
| | | 709/232 |
| 8,099,060 B2 | 1/2012 | Kirkup et al. |
| 8,559,883 B2 | 10/2013 | Chung et al. |
| 8,583,056 B2 | 11/2013 | Kirkup et al. |
| 9,820,358 B2* | 11/2017 | Takahashi .......... H05B 37/0227 |
| 2002/0119800 A1 | 8/2002 | Jaggers et al. |
| 2006/0036780 A1 | 2/2006 | Dernis et al. |
| 2006/0094442 A1 | 5/2006 | Kirkup et al. |
| 2006/0217072 A1 | 9/2006 | Poyhonen et al. |
| 2007/0026695 A1 | 2/2007 | Lee et al. |
| 2007/0038784 A1* | 2/2007 | Sung ....................... H04L 47/10 |
| | | 710/56 |
| 2007/0081486 A1* | 4/2007 | Koide .............. H04W 52/0241 |
| | | 370/328 |
| 2007/0105404 A1 | 5/2007 | Lee et al. |
| 2007/0254588 A1* | 11/2007 | Lafuente ............. H04M 1/7253 |
| | | 455/41.2 |
| 2007/0264983 A1 | 11/2007 | Chen et al. |
| 2007/0294457 A1 | 12/2007 | Gantman et al. |
| 2008/0250173 A1* | 10/2008 | Ueda ..................... G06F 13/385 |
| | | 710/63 |
| 2009/0111422 A1* | 4/2009 | Bremer ............. H04M 1/72572 |
| | | 455/404.2 |
| 2009/0117753 A1 | 5/2009 | Lee et al. |
| 2009/0137235 A1 | 5/2009 | Schmidt et al. |
| 2009/0149036 A1 | 6/2009 | Lee et al. |
| 2009/0149037 A1 | 6/2009 | Lee et al. |
| 2009/0172208 A1 | 7/2009 | Lee et al. |
| 2009/0204735 A1 | 8/2009 | Chen et al. |
| 2011/0065392 A1 | 3/2011 | Chung et al. |
| 2011/0141124 A1* | 6/2011 | Halls ...................... G06F 21/83 |
| | | 345/522 |
| 2011/0145445 A1* | 6/2011 | Malamant ............. G06F 1/3203 |
| | | 710/16 |
| 2012/0117616 A1 | 5/2012 | Kirkup et al. |
| 2012/0221719 A1 | 8/2012 | Schmidt et al. |
| 2013/0246663 A1* | 9/2013 | Raveendran ........ G06F 13/4022 |
| | | 710/8 |
| 2014/0273860 A1 | 9/2014 | Hsu |
| 2014/0279882 A1* | 9/2014 | Weiler ................ G06F 19/3418 |
| | | 707/617 |
| 2016/0142581 A1* | 5/2016 | Morita .................... H04W 4/80 |
| | | 358/1.13 |
| 2017/0293335 A1* | 10/2017 | Dunstan .................. G06F 1/266 |

* cited by examiner

US 10,282,333 B2

ELECTRONIC DEVICE OPERATING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Apr. 28, 2015 in the Korean Intellectual Property Office and assigned Serial number 10-2015-0059643, the entire disclosure of which is hereby incorporated by reference.

TECHNICAL FIELD

The present disclosure relates to a communication operation of an electronic device.

BACKGROUND

An electronic device may include various communication interfaces. For example, an electronic device includes a wireless communication interface based on a wireless communication module and a wired communication interface based on a wired communication module (for example, universal serial bus (USB)).

Moreover, in relation to slimming down an electronic device and supporting various functions thereof, a variety of devices are mounted and due to this, a hardware configuration relating to a wired communication interface and a hardware configuration relating to a wireless communication interface are disposed adjacent to each other. Accordingly, interference may occur between the wireless communication interface and the wired communication interface.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device operating method for suppressing mutual interference by selectively performing a universal serial bus (USB) communication interface operation and a wireless communication interface operation and an electronic device for supporting the same.

Another aspect of the present disclosure is to provide an electronic device operating method for performing a mutual operation as minimizing interference between a USB communication interface operation and a wireless communication interface operation and an electronic device for supporting the same.

In accordance with an aspect of the present disclosure, an electronic device is provided. The electronic device includes a memory configured to store at least one instruction associated with a USB communication function or a wireless communication function operation, and at least one processor connected to the memory and configured to execute the at least one instruction stored in the memory, wherein, when a request for execution of the wireless communication function is received during execution of the USB communication function, the at least one instruction executed by the processor causes the processor to deactivate the execution of USB communication function or to maintain the execution of the USB communication function corresponding to a type of the USB communication function.

In accordance with another aspect of the present disclosure, an electronic device operating method is provided. The electronic device operating method includes executing a USB communication function, receiving, by the electronic device, a request for execution of the wireless communication function during the execution of the USB communication function, and deactivating, by the electronic device, the execution of the USB communication function or maintaining the execution of the USB communication function corresponding to a type of the USB communication function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
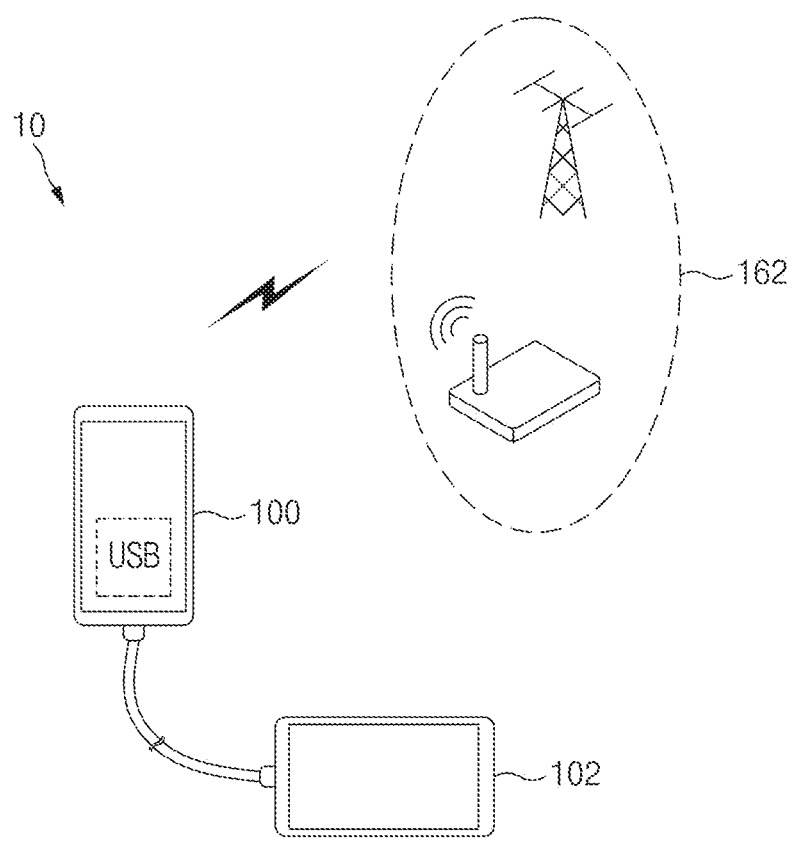
FIG. 1 is a schematic view illustrating an electronic device operating environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor) for performing corresponding operations by executing at least one software program stored in a memory device.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a schematic view illustrating an electronic device operating environment according to an embodiment of the present disclosure.

Referring to FIG. 1, an electronic device operating environment 10 according to an embodiment of the present disclosure may include an electronic device 100, an external electronic device 102, and a network 162.

The network 162 may support a wireless communication interface operation of the electronic device 100. For example, the network 162 may include a mobile communication base station or an access point (AP). The mobile communication base station may support a mobile communication function of the electronic device 100 (or the external electronic device 102). The AP may support a Wi-Fi function of the electronic device 100 (or the external electronic device 102).

The external electronic device 102 may be a device for operating a wired communication interface with the electronic device 100 through a cable. When connected to the electronic device 100 through a cable, the external electronic device 102 may transmit data to the electronic device 100 at a specified speed or receive data from the electronic device 100 at a specified speed according to a request of the electronic device 100 or a user control. According to various embodiments of the present disclosure, the external electronic device 102 may receive a message associated with wired communication function suspension and termination from the electronic device 100. When receiving a message associated with wired communication function suspension and termination from the electronic device 100, the external electronic device 102 may pause or terminate a wired communication function. When receiving a specified wired communication function activation message from the electronic device 100 connected through a cable, the external electronic device 102 may activate a specified wired communication function.

The electronic device 100 may support a wireless communication function through the network 162. The electronic device 100 may perform a wired communication function with the external electronic device 102 connected through a cable. When an event associated with wireless communication function execution occurs as a wired communication function is performed, the electronic device 100 may pause or terminate the wired communication function. During this operation, the electronic device 100 may create a message associated with wired communication function suspension or termination and provide the created message to the external electronic device 102.

When a wireless communication function is terminated, the electronic device 100 may automatically activate a paused wired communication function or a terminated wired communication function again. In relation to this, the electronic device 100 may transmit a message associated with a specified wired communication function activation to the external electronic device 102 connected through a cable. When the external electronic device 102 is not connected to the cable, the electronic device 100 may perform a control not to activate a wired communication function. When a wireless communication function in execution is terminated, the electronic device 100 may output a list of at least one function (for example, a wired communication function or a function terminated by a user's designation) that is paused or terminated immediately before (for example, before wireless communication function execution). When a user input for selecting a specific item from the list is received, the electronic device 100 may execute a function corresponding to the selected item.

The electronic device 100, for example, may include USB3.x 5 Gps/lane and 10 Gbps/lane Interfaces. The electronic device 100 may selectively limit a wired communication function or prevent the performance deterioration of a wireless communication function based on an antenna change. Through this, the electronic device 100 may support the use of a wireless communication function during data transmission and multi-media operations of a wired communication function (for example, a USB communication function) or support the use of a wired communication function during the use of a wireless communication function.

Figure 2:
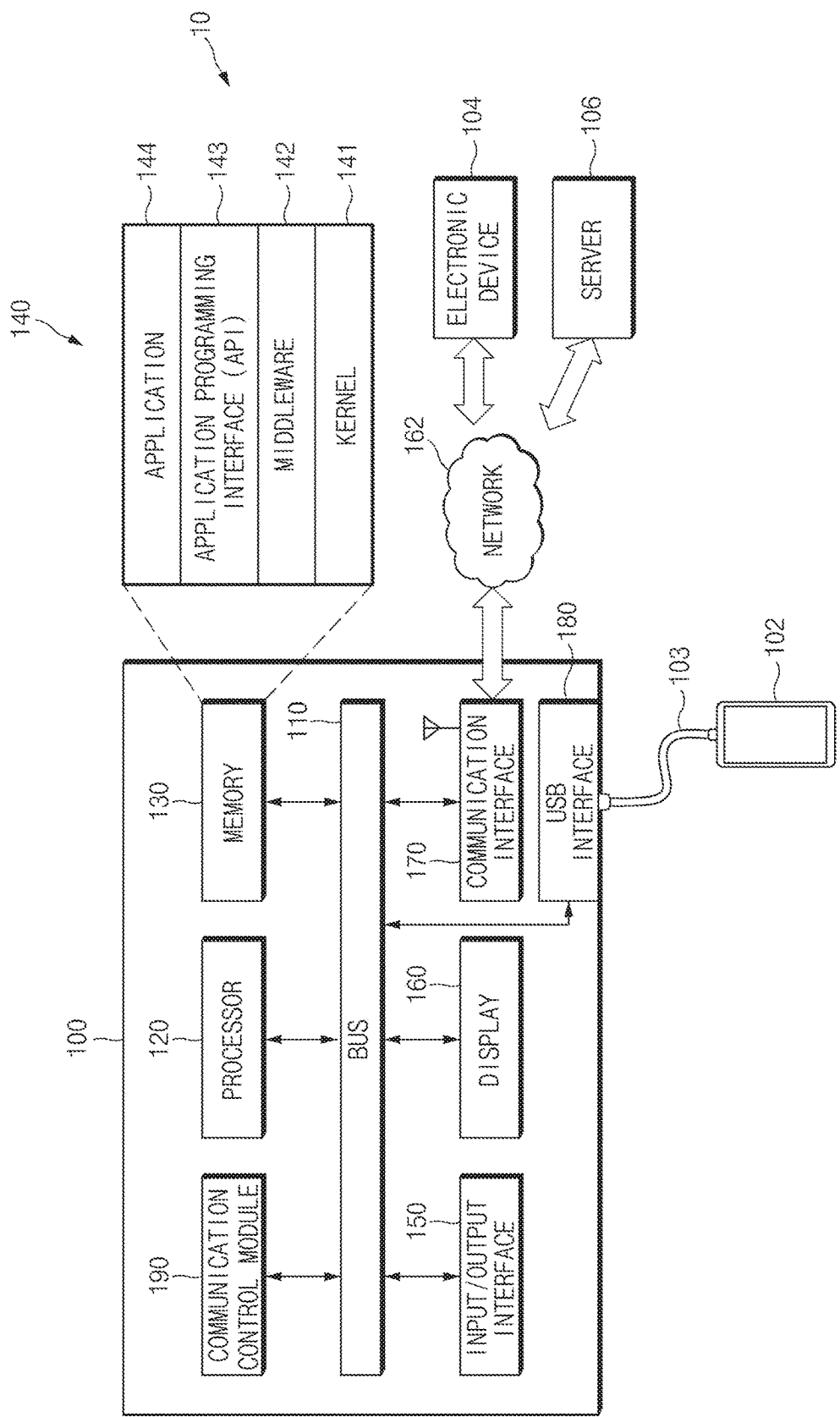
FIG. 2 is a view illustrating an electronic device and an operation environment where the electronic device operates according to an embodiment of the present disclosure.

FIG. 2 is a view illustrating an electronic device and an operation environment where the electronic device operates according to an embodiment of the present disclosure.

Referring to FIG. 2, an operation environment 10 for operating an electronic device 100 may further include the electronic device 100, a network 162, an external electronic device 102, a USB cable 103, a server 106, and an external electronic device 104. The electronic device 100 described with reference to FIG. 2 may have the same or similar configuration as the electronic device 100 described with reference to FIG. 1. The electronic device 102 described with reference to FIG. 2 may have the same or similar configuration as the electronic device 102 described with reference to FIG. 1. The network 162 described with reference to FIG. 2 may include at least part of the network 162 described with reference to FIG. 1.

The network 162, for example, may support a wireless communication channel establishment between the electronic device 100, the external electronic device 104, and the server 106. The external electronic device 102 includes a wireless communication interface, the network 162 may support a wireless communication channel establishment of the external electronic device 102. The network 162, for example, may include at least one device component for supporting a wireless communication function (for example, various wireless communication methods such as second generation (2G), third generation (3G), fourth generation (4G), long term evolution (LTE), fifth generation (5G), and so on) and a wireless access communication function (for example, a Wi-Fi communication function). Alternatively, the network 162 may include telecommunications network, for example, at least one of computer network (for example, local area network (LAN) or wireless area network (WAN)), internet, and telephone network.

The server 106 may be connected to the electronic device 100 through the network 162. The server 106 may establish a wireless communication channel in correspondence to a request of the electronic device 100. The server 106, for example, may receive specific data from the electronic device 100. Alternatively, the server 106 may transmit specific data to the electronic device 100. While data is transmitted/received based on a wireless communication channel between the server 106 and the electronic device 100, the electronic device 100 may operate a wired communication function restrictively. Alternatively, when a wired communication function of the electronic device 100 is in operation according to a user setting, a wireless communication function between the electronic device 100 and the server 106 may operate based on a specified antenna.

Each of the first and second external electronic devices 102 and 104 may have the same type as or a different type from the electronic device 100. According to various embodiments of the present disclosure, all or part of operations executed on the electronic device 100 may be executed on another one or more electronic devices (for example, the external electronic device 102 or 104 or the server 106). According to an embodiment of the present disclosure, when the electronic device 100 performs a certain function or service automatically or by a request, it may request at least part of a function relating thereto from another device (for example, the external electronic device 100 or 104 or the server 106) instead of or in addition to executing the function or service by itself. The other electronic device (for example, the external electronic device 102 or 104 or the server 106) may execute a requested function or an additional function and may deliver an execution result to the electronic device 100. The electronic device 100 may provide the requested function or service as it is or by processing the received result additionally. For this, for example, cloud computing, distributed computing, or client-server computing technology may be used.

The electronic device 100 may include a bus 110, a processor 120, a memory 130, an input/output interface 150, a display 160, a communication interface 170, a wired communication interface, for example, a universal serial bus (USB) interface 180, and a communication control module 190.

The bus 110, for example, may include a circuit for connecting the components 110 to 190 to each other and delivering a communication (for example, control message and/or data) between the components 110 to 190.

The processor 120 may include at least one of a central processing unit (CPU), an application processor (AP), and a communication processor (CP). The processor 120, for example, may execute calculation or data processing for control and/or communication of at least one another component of the electronic device 100. According to an embodiment of the present disclosure, the processor 120 may perform signal processing of communication modules relating to a wired communication function operation and a wireless communication function operation. For example, the processor 120 may limit a wired communication function when wireless communication function execution is requested during a wired communication function operation. According to an embodiment of the present disclosure, when wireless communication function execution is requested during a wired communication function operation, the processor 120 may perform signal processing to execute a wireless communication function based on a specified antenna while maintaining a wired communication function. In relation to the above-mentioned function performance, the processor 120 may operate at least one processor (for example, an AP, a CP, or an integrated processor).

The communication control module 190 may perform function processing associated with a communication function operation of the electronic device 100. At least part of the communication control module 190 may be configured with the processor 120 or at least one processor 120. Although it is described that the communication control module 190 is separated from the processor 120, the communication control module 190 may operate in a form of being integrated into the processor 120.

According to an embodiment of the present disclosure, the communication control module 190 may perform a wired communication interface (for example, the USB interface 180) based USB communication function control (hereinafter, a USB communication function in a wired communication interface is described as one example). For example, when a cable is connected to the USB interface 180, the communication control module 190 may recognize the connection of the external electronic device 102, and control related application or driver activation. When the connection of the USB interface 180 of the external electronic device 102 is performed, the communication control module 190 may perform a control to output a related user interface (UI) to the display 160. The communication control module 190 may control application execution associated with a specified function (for example, a data transmission function and a screen output function) in correspondence to input event occurrence.

According to various embodiments of the present disclosure, when wireless communication function execution is requested during USB communication function performance, the communication control module 190 may limit, pause, or terminate a USB communication function. Alternatively, when wireless communication function execution is requested during USB communication function performance, the communication control module 190 may perform a control to operate a wireless communication function based on a specified antenna. Alternatively, the communication control module 190 may support a wireless function operation based on a specified antenna, or terminate or pause a USB communication function in execution depending on an electric field situation during a USB communication function performance.

In relation to the function control, the communication control module 190 may operate at least one processor or include at least one processor. For example, the communication control module 190 may include an AP, a CP, or an integrated processor. In this case, at least part of the communication control module 190 may be included in the processor 120. Alternatively, the communication control module 190 may be prepared in a separate hardware processor form in relation to the USB communication function and wireless communication function operations.

Accordingly, the communication control module 190 may be understood as a communication function operation related processing module or at least part of the processor 120 for performing communication operation related processing.

The memory 130 may include volatile and/or nonvolatile memory. The memory 130, for example, may store instructions or data associated with at least one another component of the electronic device 100. The instructions may be executed by at least one of the processor or the communication control module 190. The instructions may include at least one instruction associated with a USB communication function operation, at least one instruction associated with a wireless communication function operation, and at least one instruction set to perform a specified operation when wireless communication function execution is requested during a USB communication function operation.

According to an embodiment of the present disclosure, the specified operation related instruction, for example, may include an instruction set to limit at least part of a USB communication function, an instruction set to pause a USB communication function, and an instruction set to terminate a USB communication function. The specified operation related instruction may include an instruction set to perform a wireless communication function through a specified antenna while maintaining a USB communication function.

According to an embodiment of the present disclosure, the specified operation related instruction may include an instruction for detecting an electric field situation during a USB communication function operation and an instruction set to maintain a USB communication function according to an electric field situation (for example, when an electric field situation is a strong electric field situation of greater than a specified condition), pause a USB communication function (for example, when an electric field situation is a middle or weak electric field situation of less than a specified condition), or terminate a USB communication function (for example, when an electric field situation is less than a specified condition or an electric field situation of less than a specified condition is maintained for greater than a specified time). Alternatively, the specified operation related instruction may include an instruction for detecting an electric field situation during a USB communication function operation and an instruction set to perform a wireless communication function through a specified antenna while maintaining a USB communication function according to an electric field situation.

According to various embodiments of the present disclosure, the memory 130 may store software and/or program 140. The program 140 may include a kernel 141, a middleware 142, an application programming interface (API) 143, and/or an application program (or an application) 144. At least part of the kernel 141, the middleware 142, and the API 143 may be called an operating system (OS).

The kernel 141, for example, may control or manage system resources (for example, the bus 110, the processor 120, the memory 130, and so on) used for performing operations or functions implemented in other programs (for example, the middleware 142, the API 143, or the application program 144). The kernel 141 may provide an interface for controlling or managing system resources by accessing an individual component of the electronic device 100 from the middleware 142, the API 143, or the application program 144.

The middleware 142, for example, may serve as an intermediary role for exchanging data as the API 143 or the application program 144 communicates with the kernel 141. The middleware 142 may process at least one job request received from the application program 144 according to a priority. For example, the middleware 142 may assign to at least one application program 144 a priority for using a system resource (for example, the bus 110, the processor 120, or the memory 130) of the electronic device 100. For example, the middleware 142 may perform scheduling or load balancing on the at least one job request by processing the at least one job request according to the priority assigned to the at least one job request.

The API 143, for example, may include an interface that the application program 144 uses to control a function provided from the kernel 141 or the middleware 142. The API 143, for example, may include at least one interface or function (for example, an instruction) for file control, window control, image processing, or character control.

The input/output interface 150, for example, may serve as an interface for delivering instructions or data inputted from a user or another external device to another component(s) of the electronic device 100. The input/output interface 150 may output instructions or data received from another component(s) of the electronic device 100 to a user or another external device. The input/output interface 150, for example, may include at least one physical button, touch button, touch pad, or touch screen. The input/output interface 150 may include an input means by an electronic pen.

The input/output interface 150 may include an audio device for processing audio signals. An audio device may output audio data associated with a USB communication function or wireless communication function operation. For example, when a wireless communication function execution request occurs during a USB communication function operation, an audio device may output a guide sound corresponding thereto. When an electric field situation is changed to be less than a specified condition during a USB communication function operation, an audio device may output a guide sound corresponding thereto. When a wireless communication function is executed based on a specified antenna during a USB communication function operation, an audio device may output a guide sound corresponding thereto. An audio device may output guide information (for example, information for guiding USB communication function suspension or termination) associated with a wireless communication function operation of an improved quality. The output of the audio data may be omitted according to a setting.

The display 160, for example, may include a liquid crystal display (LCD), a light emitting diode (LED) display, an organic light emitting diode (OLED) display, a microelectromechanical systems (MEMS) display, or an electronic paper display. The display 160 may display various contents (for example, text, image, video, icon, symbol, and so on) to a user. The display 160 may include a touch screen, and for example, may receive a touch, gesture, proximity, or hovering input by using an electronic pen or a user's body part.

The display 160, for example, may output at least one text or image associated with the USB communication function or wireless communication function operation of the electronic device 100. For example, the display 160 may output a screen corresponding to USB cable connection and a screen (for example, a USB communication type, a USB communication setting state, and the type of a function in execution through USB communication) according to a USB communication function operation. The display 160 may output a screen including at least one object corresponding to a change of an electric field situation during a USB communication function operation. When a wireless communication function execution request occurs during a USB communication function operation, the display 160 may output a screen corresponding to the execution request occurrence. When wireless communication function execution is requested during a USB communication function operation, the display 160 may output a screen for pausing or terminating a USB communication function. The display 160 may output a screen for terminating a USB communication function in operation according to an electric field situation.

The communication interface 170, for example, may set communication between the electronic device 100 and an external device (for example, the second external electronic device 104 or the server 106). For example, the communication interface 170 may communicate with an external device (for example, the second external electronic device 104 or the server 106) in connection to the network 162 through wireless communication.

The wireless communication, as a cellular communication protocol, may use at least one of LTE, LTE advance (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication, for example, may include short-range communication. The short range communication, for example, may include at least one of Wi-Fi, Bluetooth (BT), near field communication (NFC), global positioning system (GPS), and so on.

The GNSS may include at least one of GPS, Glonass, and Beidou Navigation Satellite System (hereinafter referred to as Beidou) and Galileo, that is, the European global satellite-based navigation system. Hereinafter, GPS and GNSS may be interchangeably used.

The wired communication interface, for example, may include at least one of universal serial bus (USB), high definition multimedia interface (HDMI), recommended standard 232 (RS-232), plain old telephone service (POTS), and so on.

The USB interface 180 may include a USB connector connected to a USB communication cable, a plurality of terminals included in the USB connector, and a signal line connected between the plurality of terminals and the processor 120 (or the communication control module 190). The USB interface 180, for example, may support at least one of various types such as USB 2.x and USB 3.x. The USB interface 180 may be prepared in one form of Types A, B, and C in correspondence to a connected connector form. The USB interface 180, as a configuration for supporting a USB communication function, is not limited to its form or communication method.

According to an embodiment of the present disclosure, USB 3.0 (5 Gbps/lane) applicable to the USB interface 180 may recognize the connection of a cable or the external electronic device 102 by recognizing a terminal resistance of a reception (Rx) path. A transmission (Tx) path of USB 3.0 is delivered from an AP to a receiver through a Re-driver, and an Rx path is delivered to an AP through a transceiver of the electronic device 100 or the external electronic device 102. Herein, the external electronic device 102 may include a storage device such as a PC or Memory Stick.

In relation to USB 3.1 Gen1 (5 Gbps/lane) and Gen2 (10 Gbps/lane) where Type C is applied, Connection Detection, Identification of cable type, interface configuration, and enables vendor defined messages may be determined through a chip configuration (CC) pin. In relation to this, USB 3.1 Gen1 or Gen2 may have the same structure as USB 3.0 or a structure passing through a Switch (for example, 2 port-to-1 port) at the middle. USB 3.0 and USB 3.1 may operate with a Data transmission Rate of 2.5 GHz (for example, Gen2 5 GHz). The USB interface 180, for example, may operate to suppress the Radio Frequency Interference of USB3.x (for example, USB3.1 Gen1 and Gen2) Interface.

Figure 3A:
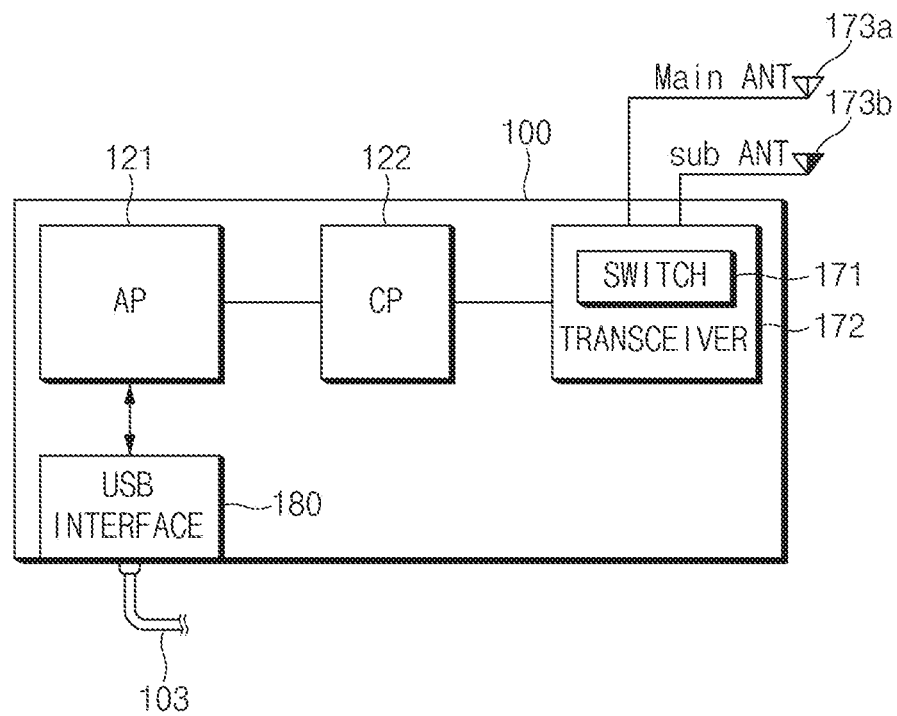
FIG. 3A is a view illustrating a configuration of an electronic device according to an embodiment of the present disclosure.

FIG. 3A is a view illustrating a configuration of an electronic device according to an embodiment of the present disclosure.

Referring to FIG. 3A, at least part of an electronic device 100 according to an embodiment of the present disclosure may include a USB interface 180, an AP 121, a CP 122, a transceiver 171, a main antenna 173a, and a sub antenna 173b.

The USB interface 180, for example, may include a USB connector and signal lines. The USB connector may include at least one electrode that electrically contacts the terminals of a connected USB cable 103. The signal lines may connect at least one electrode and the AP 121. The USB interface 180 may be prepared in various forms according to the type. Alternatively, the USB interface 180 may be prepared in one of a form of supporting one of USB 2.0 and USB 3.x and an integrated form of supporting two methods. The USB interface 180 may include a circuit (for example, a circuit including a device with a set pull-up voltage) for detecting cable insertion or the insertion of a cable connected to the external electronic device 102. According to an embodiment of the present disclosure, the USB interface 180 may support at least one of a USB communication function for transmitting USB data (for example, at least one content data and control data) and a USB communication function (for example, a USB display function) for transmitting display data.

A position at which the USB connector of the USB interface 180 is disposed, for example may be a position adjacent to a position at which the communication interface 170 (for example, an antenna relating to a 3G, 4G, or LTE communication module) of the electronic device 100 or a mechanically and vertically overlaid position. According to an embodiment of the present disclosure, the USB connector may be disposed at a predetermined lower end (or at least one point of an upper end and a side part) position of the electronic device 100.

The AP 121 may be a processor for performing signal processing associated with a function operation of the electronic device 100. According to an embodiment of the present disclosure, the AP 121 may be disposed between the USB interface 180 and the CP 122. When the external electronic device 102 is connected through the USB interface 180, the AP 121 may process a USB communication function with the external electronic device 102. For example, when the external electronic device 102 is connected, the AP 121 may transmit USB communication data (for example, USB data or USB display data) to the external electronic device 102 or receive USB communication data (for example, USB data or USB display data) from the external electronic device 102.

The AP 121 may receive an event associated with an execution request of a wireless communication function (or a voice call or video call function or a data communication function) from the CP 122. When a wireless communication function execution request related event is received, the AP 121 may pause or terminate a USB communication function according to a setting. During this operation, the AP 121 may store USB communication function related information (for example, the type of data transmitted through USB communication, the type of an application in execution in relation to USB communication, and screen information associated with an application in execution in relation to USB communication). When a wireless communication function termination related event is received from the CP 122 or a wireless communication function termination related event is received from the input/output interface 150, the AP 121 may re-execute a USB communication function. During this operation, the AP 121 may process USB communication function re-execution based on pre-stored USB communication function related information.

According to various embodiments of the present disclosure, when a USB communication function is executed, the AP 121 may determine an electric field situation associated with a wireless communication function. According to an embodiment corresponding thereto, when an electric field situation of a wireless communication function is less than a specified condition during a USB communication function operation, the AP 121 may perform a control to pause or terminate a USB communication function. A specified condition associated with the electric field situation may be set based on at least one factor (for example, a radio signal reception intensity, a data transmission rate, and system information provided by a base station) for determining an electric field situation.

According to various embodiments of the present disclosure, when an electric field situation of a wireless communication function is less than a specified condition during a USB communication function operation, the AP 121 may control the switch 172 to disconnect the main antenna 173a and connect the sub antenna 173b. When an electric field situation of a wireless communication function is greater than a specified condition during a USB communication function operation, the AP 121 may control the switch 172 to have a state for operating both the main antenna 173a and the sub antenna 173b.

According to various embodiments of the present disclosure, when a USB communication function is operated, the AP 121 may control the switch 172 to disconnect the main antenna 173a and connect the sub antenna 173b. When an electric field situation of a wireless communication function is greater than a specified condition during a USB communication function operation, the AP 121 may control the switch 172 to have a state for operating both the main antenna 173a and the sub antenna 173b.

According to various embodiments of the present disclosure, the AP 121 may control a screen interface output associated with a USB communication function operation. During this operation, the AP 121 may perform a control to output a USB communication function suspension or termination related input control screen to the display 160 according to an electric field situation. Alternatively, during a USB communication function operation, the AP 121 may perform a control to disconnect the main antenna 173a and output an input control screen associated with an operation of the sub antenna 173b to a display. Alternatively, when a wireless communication function execution request occurs during a USB communication function operation, the AP 121 may perform a control to disconnect the main antenna 173a and output an input control screen associated with an operation of the sub antenna 173b to a display. Alternatively, when a wireless communication function execution request occurs during a USB communication function operation, the AP 121 may perform a control to output a USB communication function suspension or termination related input control screen to a display.

The CP 122 may process wireless signal reception associated with wireless communication function execution as connected to the transceiver 171. According to various embodiments of the present disclosure, the CP 122 may process wireless signal transmission associated with a wireless communication function (for example, a call function or a data communication function) according to a user input associated with wireless communication function execution. When a wireless signal associated with wireless communication function execution is received, the CP 122 may deliver a wireless communication function execution request event to the AP 121. The CP 122 may deliver a wireless communication function termination related event (for example, an event according to a wireless resource release occurrence or wireless resource release related input event occurrence) to the AP 121. The CP 122 may collect at least one wireless signal (or system information provided by a base station) associated with an electric field situation and provide electric field situation information according to a wireless signal to the AP 121. The CP 122 may receive a control signal associated with a control of the switch 172 from the AP 121. In this case, the CP 122 may control at least one of the main antenna 173a and the sub antenna 173b to be in an operable state according to a request of the AP 121.

The transceiver 171 may be connected to the CP 122 and antennas (for example, the main antenna 173a and the sub antenna 173b). The transceiver 171 may output a specified wireless signal according to a control of the CP 122 or may deliver a wireless signal received by at least one of the main antenna 173a and the sub antenna 173b to the CP 122. The transceiver 171 according to an embodiment of the present disclosure may include the switch 172. The switch 172 may control a selective connection of the main antenna 173a and the sub antenna 173b. The switch 172 may be designed to be directly controlled by the AP 121 or the CP 122 according to a design method. Alternatively, the transceiver 171 connected to the CP 122 may change an operating state of the switch 172 according to a control signal received from the CP 122. According to an embodiment of the present disclosure, as the switch 172 is connected to the main antenna 173a, it may control connection or disconnection between the main antenna 173a and the transceiver 171.

The main antenna 173a may be prepared to support a wireless communication function of the electronic device 100. According to an embodiment of the present disclosure, the main antenna 173a may be prepared to be in charge of at least one wireless frequency band. The main antenna 173a, for example, may be disposed at a lower end (or at least one point of an upper end and a side end) of the electronic device 100. Accordingly, the main antenna 173a may be disposed adjacent to the USB interface 180. According to an embodiment of the present disclosure, the main antenna 173a may be disposed at a lower part or an upper part of a position at which the USB interface 180 is disposed. At least a part of the main antenna 173a is prepared in a pattern and disposed at the case of the electronic device 100. Alternatively, at least a part of the main antenna 173a may be prepared in a pattern and disposed inside the electronic device 100 after seated on an additional mechanical structure (for example, a carrier). One side of the main antenna 173a may be connected to the switch 172 of the transceiver 171. The main antenna 173a may be electrically connected to or electrically isolated from (or disconnected) from the transceiver 171 according to a state of the switch 172.

The sub antenna 173b may be prepared to support a wireless communication function of the electronic device 100 selectively or according to a setting. According to an embodiment of the present disclosure, the sub antenna 173b may be prepared to be in charge of a wireless frequency band that is similar to a wireless frequency band in charge of the main antenna 173a or may be prepared to be in charge of an additional wireless frequency band. The sub antenna 173b may be disposed at a position spaced a predetermined distance away from the main antenna 173a. According to an embodiment of the present disclosure, when the main antenna 173a is disposed at the lower end of the electronic device 100, the sub antenna 173b may be disposed at the upper end of the electronic device 100. Alternatively, when the main antenna 173a is disposed at one side surface, the sub antenna 173b may be disposed at the other side surface of the electronic device 100. The sub antenna 173b may be prepared in a pattern and disposed at a case (for example, a rear case or a battery case) of the electronic device 100. Alternatively, the sub antenna 173b may be prepared in a pattern at a separately prepared carrier. The sub antenna 173b may be connected to the transceiver 171 through the switch 172. Accordingly, the sub antenna 173b may be electrically connected to or electrically isolated from the transceiver 171 according to a state of the switch 172. According to various embodiments of the present disclosure, the sub antenna 173b may be connected to the transceiver 171 without going through the switch 172.

Figure 3B:
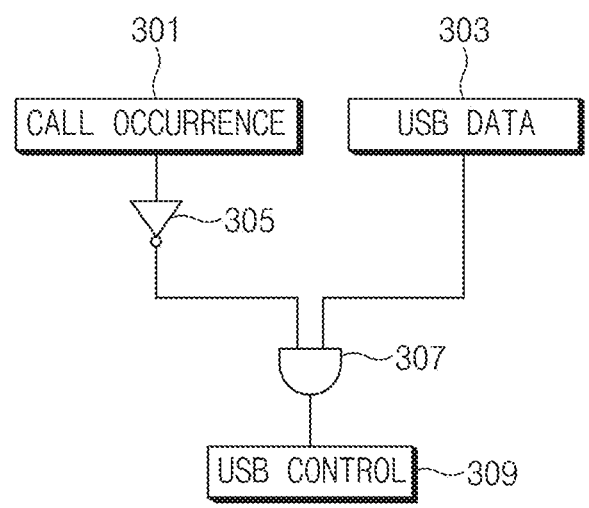
FIG. 3B is a view illustrating a logic circuit relating to an electronic device operation according to an embodiment of the present disclosure.

FIG. 3B is a view illustrating a logic circuit relating to an electronic device operation according to an embodiment of the present disclosure.

Referring to FIG. 3B, the logic circuit, for example, may include a first input terminal 301 for providing a call occurrence related event, a second input terminal 303 for providing a USB data occurrence related event, an inverter 305, an AND gate 307, and an output terminal 309.

The first input terminal 301, for example, may be an input terminal where a call occurrence related signal, which occurs from at least one of the CP 122, the transceiver 171, the main antenna 173a, and the sub antenna 173b, is inputted. According to an embodiment of the present disclosure, when a call reception request (from the external electronic device 102) or a call connection request (by a user input from the electronic device 100) occurs in relation to a wireless communication function, the first input terminal 301 may deliver a specified value (for example, "1") corresponding to a call occurrence related signal value to the inverter 305. When a wireless communication function is terminated or there is no wireless communication function execution, the first input terminal 301 may deliver a specified value (for example, "0") to the inverter 305.

The inverter 305 may covert a signal value delivered by the first input terminal 301 into a specified value and deliver the specified value. For example, when receiving a value of "1" from the first input terminal 301, the inverter 305 may output "0". When receiving a value of "0" from the first input terminal 301, the inverter 305 may output "1".

The second input terminal 303 may be an input terminal where a signal occurring in relation to the USB interface 180 is inputted. According to an embodiment of the present disclosure, when the external electronic device 102 is connected to the USB interface 180, the second input terminal 303 may input a specified value (for example, "1"). According to an embodiment of the present disclosure, when the external electronic device 102 is not connected to the USB interface 180 or a connected state is released, the second input terminal 303 may input a specified value (for example, "0").

The AND gate 307 may include two input terminals and one output terminal. The AND gate 307 may be connected to the inverter 305 and the second input terminal 303. The AND gate 307 may output a product value of signals delivered from the inverter 305 and the second input terminal 303. According to an embodiment of the present disclosure, when receiving a value of "1" from the inverter 305 (that is, a value of "0" from the first input terminal 301) and receiving a value of "1" from the second input terminal 303, the AND gate 307 may deliver a value of "1" to the output terminal 309. When receiving a value of "0" from at least one of the inverter 305 and the second input terminal 303, the AND gate 307 may deliver a value of "0" to the output terminal 309.

The output terminal 309 may perform a USB communication function control according to an output of the AND gate 307. For example, when receiving a value of "0" from the AND gate 307, the output terminal 309 may deactivate (pause or terminate) a USB communication function. When receiving a value of "1" from the AND gate 307, the output terminal 309 may activate a USB communication function.

When a call occurs and a USB communication function is in execution, the logic circuit, for example, may perform a control to deactivate a USB communication function. When a call does not occur and a USB communication function is in execution, the logic circuit, for example, may maintain the USB communication function in an activation state.

Figure 4:
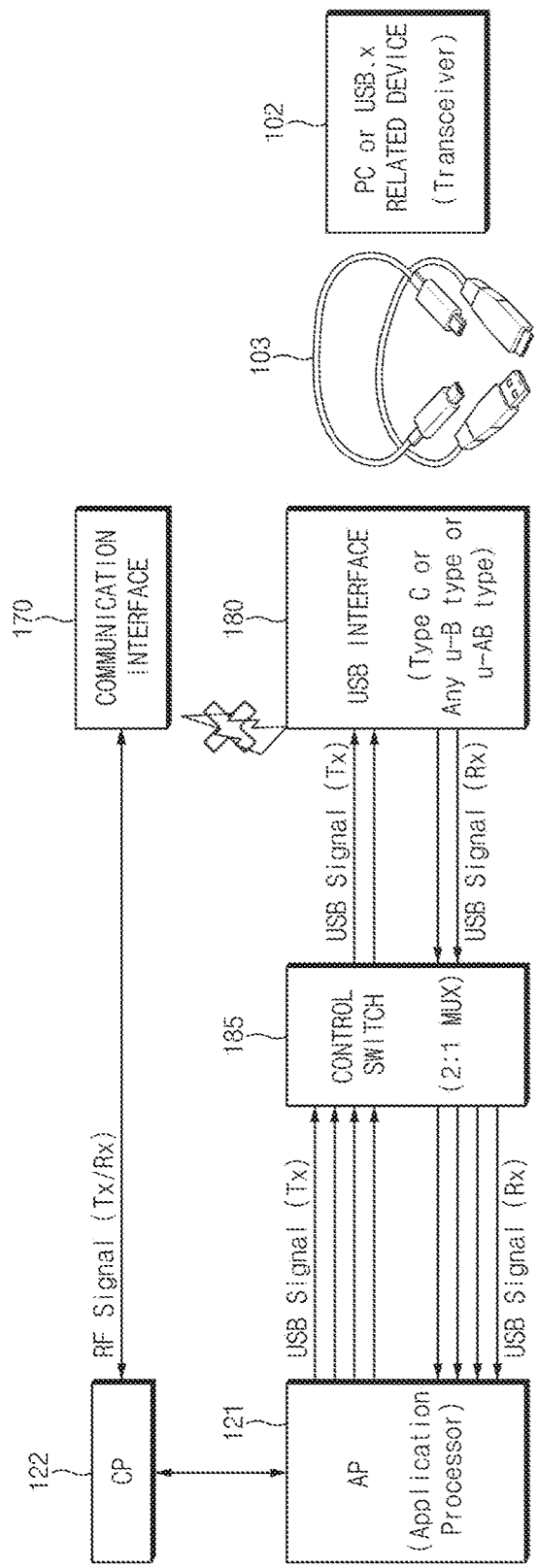
FIG. 4 is a view illustrating an electronic device configuration of a switch control method according to an embodiment of the present disclosure.

FIG. 4 is a view illustrating an electronic device configuration of a switch control method according to an embodiment of the present disclosure.

Referring to FIG. 4, an electronic device 100 according to an embodiment of the present disclosure may include an AP 121, a CP 122, a control switch 185, a communication interface 170, and a USB interface 180. One end of the USB cable 103 may be connected to the USB interface 180 of the electronic device 100 and the other end may be connected to the external electronic device 102.

The AP 121 may be disposed between the CP 122 and the control switch 185. The AP 121 may receive a wireless communication function execution related event from the CP 122. The AP 121 may receive an event associated with an operation of the USB interface 180 from the control switch 185. When receiving a wireless communication function execution related event from the CP 122 through the USB interface 180 while operating a USB communication function with the external electronic device 102, the AP 121 may request the control switch 185 to deactivate a USB communication function. The control switch 185 may perform a control to deactivate a USB communication function through the USB interface 180. For example, the control switch 185 may release a connection with the USB interface 180. During this operation, the control switch 185 may perform a control to transmit a USB communication function deactivation related message to the external electronic device 102.

The control switch 185 may be disposed between the AP 121 and the USB interface 180. According to an embodiment of the present disclosure, the control switch 185 may be connected to the AP 121 through a first predetermined number of transmission lines and a first predetermined number of reception lines. Alternatively, the control switch 185 may be connected to the USB interface 180 through a second predetermined number of transmission lines and a second predetermined number of reception lines between the control switch 185 and the USB interface 180. The control switch 185 may control a channel connection or a channel release with the USB interface 180 in correspondence to a control of the AP 121.

The USB interface 180 may include a physical interface (for example, a USB connector) connected to the USB cable 103 and signal lines connected to the control switch 185. The USB interface 180 may be prepared to deliver a specified signal to the control switch 185 when the external electronic device 102 is coupled. The USB interface 180 may be prepared in one of various methods or various types.

The USB cable 103 may include a first connection head connectable to the USB interface 180, a cable connected to a connection head, and a second connection head connectable to the external electronic device 102. The size and form of the USB cable 103 may be prepared in correspondence to the communication method or type of the USB interface 180. According to an embodiment of the present disclosure, the USB cable 103 may allow high speed data transmission (or data transfer). For example, the USB cable 103 may be prepared to support greater than a specified data transmission speed. The USB cable 103 may be prepared to support a data display function.

The external electronic device 102 may be connected to the electronic device 100 through the USB cable 103. The external electronic device 102 may transmit/receive USB data or USB display data to/from the electronic device 100 through the USB cable 103. The external electronic device 102 may pause or terminate a USB communication function according to a request of the electronic device 100. The external electronic device 102 may re-execute the paused or terminated USB communication function according to a request of the electronic device 100.

The electronic device 100 may process USB communication function limitation in relation to wireless communication function execution by controlling the control switch 185 connected to the AP 121. For example, when wireless communication function execution is requested during USB communication function execution, the AP may deactivate a USB communication function by controlling the control switch 185. Alternatively, when an electric field situation is less than a specified condition during USB communication function execution, a USB communication function may be deactivated. When a wireless communication function is terminated in a state that a USB communication function is terminated due to a wireless communication function, the AP may reestablish a USB communication channel by controlling the control switch 185. The AP 121 of the electronic device 100 may perform a USB communication function control according to an electric field situation through the control switch 185.

Figure 5:
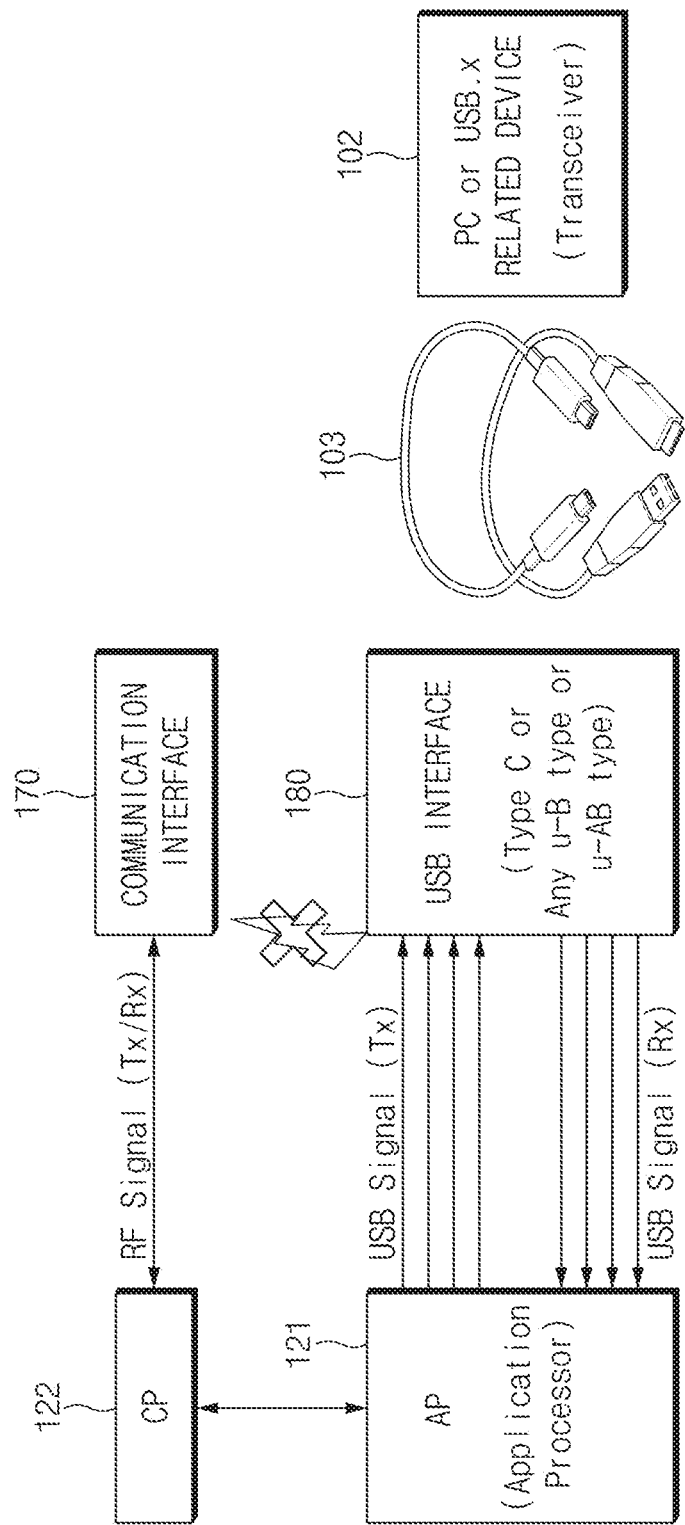
FIG. 5 is a view illustrating an electronic device configuration of a direct control method according to an embodiment of the present disclosure.

FIG. 5 is a view illustrating an electronic device configuration of a direct control method according to an embodiment of the present disclosure.

Referring to FIG. 5, an electronic device 100 according to an embodiment of the present disclosure may include an AP 121, a CP 122, a communication interface 170, and a USB interface 180. One end of the USB cable 103 may be connected to the USB interface 180 of the electronic device 100 and the other end may be connected to the external electronic device 102.

The AP 121 may be disposed between the CP 122 and the USB interface 180. The AP 121 may receive a wireless communication function execution related event from the CP 122. The AP 121 may receive an event associated with the connection of the external electronic device 102 or USB communication function execution from the USB interface 180. When receiving a wireless communication function execution request from the CP 122, the AP 121 may check whether a USB communication function is in execution. Alternatively, when the USB communication function is in execution, the AP 121 may check whether a wireless communication function execution request occurs. When a wireless communication function is executed during USB communication function execution, the AP 121 may control USB communication function deactivation through the USB interface 180. During this operation, the AP 121 may transmit a USB communication function deactivation related message to the external electronic device 102 through the USB interface 180.

When a wireless communication function is terminated, the AP 121 may perform a control to re-execute a USB communication function. Alternatively, when a wireless communication function is terminated, the AP 121 may output a screen for re-executing a previously terminated USB communication function. The AP 121 may collect information on an electric field situation from the CP 122. The AP 121 may deactivate a USB communication function in execution according to an electric field situation. Alternatively, the AP 121 may isolate a main antenna according to an electric field situation and control a sub antenna operation.

A Tx/Rx path may be connected to an AP USB pin directly or through an internal switch.

The USB interface 180 may be prepared to detect connection when the external electronic device 102 is connected through the USB cable 103. The USB interface 180 may deliver a signal according to the connection of the external electronic device 102 to the AP 121. The USB interface 180, for example, may be disposed at a position adjacent to a position at which a component (for example, a main antenna) of the communication interface 170 is disposed.

The external electronic device 102 may transmit/receive USB communication function related control data or USB data (or USB display data) to/from the AP 121 through the USB cable 103 and the USB interface 180. The external electronic device 102 may deactivate a USB communication function according to a control of the AP 121. The external electronic device 102 may re-execute the deactivated USB communication function according to a control of the AP 121.

Figure 6:
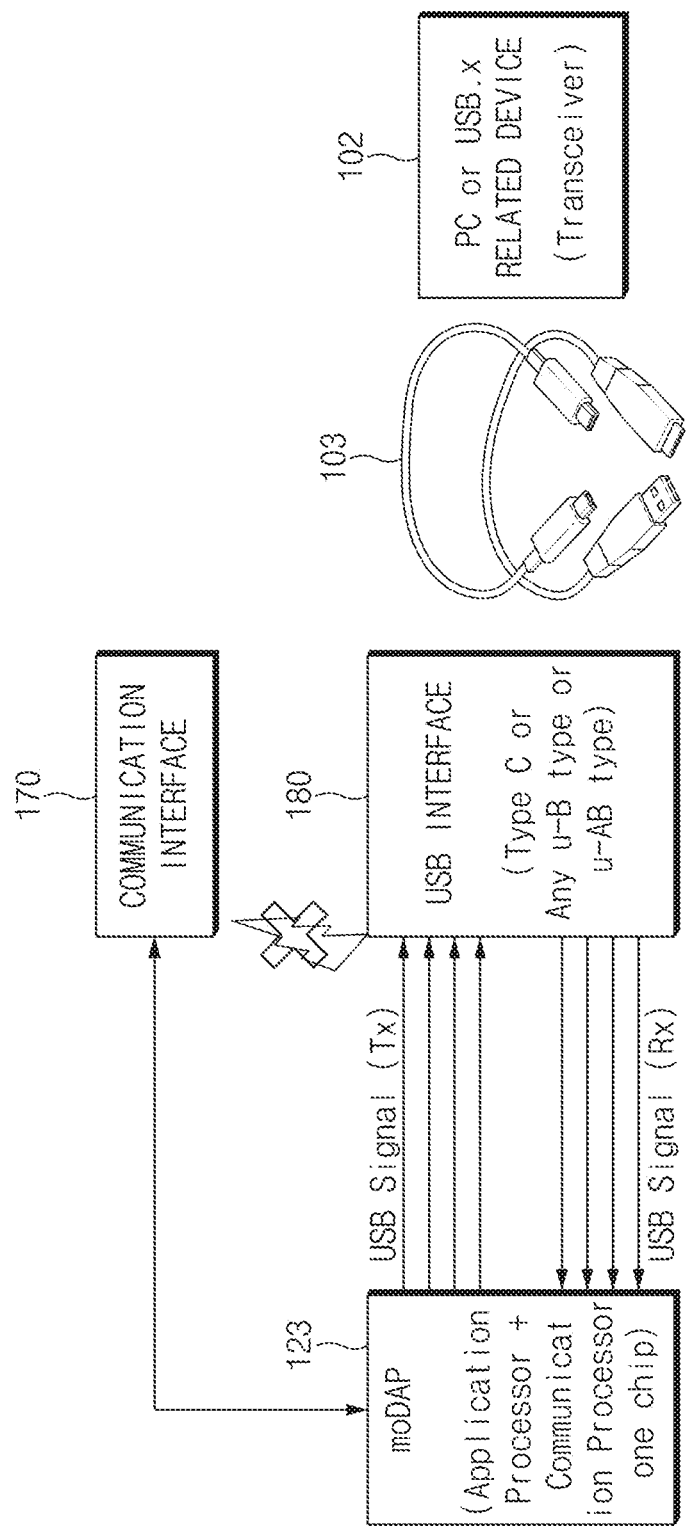
FIG. 6 is a view illustrating an electronic device configuration according to another embodiment of the present disclosure.

FIG. 6 is a view illustrating an electronic device configuration according to another embodiment of the present disclosure.

Referring to FIG. 6, an electronic device 100 according to an embodiment of the present disclosure may include an integrated processor 123, a communication interface 170, and a USB interface 180. The USB cable 103 may support USB communication function related signal delivery by connecting the electronic device 100 and the external electronic device 102. The integrated processor 123 is in a form that the CP and the AP are implemented in one chip, and radio frequency (RF) Signal and USB Signal Detection may be performed in the one chip.

The integrated processor 123 may check whether the external electronic device 102 is connected to the USB interface 180. When the external electronic device 102 is connected, the integrated processor 123 may process a USB communication function with the connected external electronic device 102 in correspondence to set schedule information or a user input. During this operation, the integrated processor 123 may check whether wireless communication function execution is requested through the communication interface 170. For example, the integrated processor 123 may check whether a call channel establishment request or a data communication channel establishment request occurs. When a wireless communication function execution related event occurs, the integrated processor 123 may perform a control to deactivate a USB communication function according to a setting.

According to an embodiment of the present disclosure, when a wireless communication function execution related event occurs during USB communication function performance, the integrated processor 123 may cut off the connection of a main antenna and operate a wireless communication function based on a sub antenna. When an electric field situation is less than a specified condition during USB communication function performance, the integrated processor 123 may process wireless communication function execution preparation (for example, pilot signal reception and call reception standby) through a sub antenna. During this operation, when a wireless communication function execution is requested, the integrated processor 123 may perform a wireless communication function based on a sub antenna.

According to an embodiment of the present disclosure, when a wireless communication function is terminated, the integrated processor 123 may re-execute a USB communication function that is deactivated due to the wireless communication function. In relation to this, the integrated processor 123 may transmit a USB communication function re-execution related message to the external electronic device 102 through the USB cable 103. The integrated processor 123 may perform a control to output a screen for controlling the execution of a wireless communication function during USB communication function execution to the display 160.

As mentioned above, according to an embodiment of the present disclosure, an electronic device may include a memory configured to store at least one instruction associated with a USB communication function or a wireless communication function operation; and at least one processor connected to the memory and configured to execute the at least one instruction stored in the memory, wherein when the wireless communication function execution is requested during the USB communication function execution, the at least one instruction executed by the processor may be set to deactivate the USB communication function in execution according to a type of the USB communication function.

According to various embodiments of the present disclosure, when a transmission speed of the USB communication function is greater than a specified transmission speed, the instruction may be set to deactivate the USB communication function in correspondence to the wireless communication function execution request. According to various embodiments of the present disclosure, when the transmission speed of the USB communication function is less than a specified transmission speed, the instruction may be set to maintain the USB communication function in correspondence to the wireless communication function execution request.

According to various embodiments of the present disclosure, when the USB communication function is a USB display data transmission function for transmitting an image, the instruction may be set to deactivate the USB communication function in correspondence to the wireless communication function execution request.

According to various embodiments of the present disclosure, when the wireless communication function is terminated, the instruction may be set to re-execute the deactivated USB communication function or output the deactivated USB communication function list.

According to various embodiments of the present disclosure, when at least one of a wireless communication function execution related connection request, a wireless communication function execution related user input, and a wireless communication function execution setting related request occurs from the outside, the instruction may be set to deactivate the USB communication function.

According to various embodiments of the present disclosure, when the wireless communication function is terminated, the instruction may be set to check USB connection of an external electronic device and when the USB connection is maintained, re-execute the deactivated USB communication function.

According to various embodiments of the present disclosure, when the wireless communication function is terminated, the instruction may be set to check USB connection of an external electronic device and when the USB connection is released, output the deactivated USB communication function list.

According to various embodiments of the present disclosure, when the wireless communication function execution request occurs, the instruction may be set to output a screen for selecting whether to maintain the USB communication function or whether to deactivate the USB communication function.

According to various embodiments of the present disclosure, when the wireless communication function execution request occurs, the instruction may be set to output guide information for guiding the deactivation of the USB communication function.

According to various embodiments of the present disclosure, the electronic device may further include a USB interface for supporting external electronic device connection.

According to various embodiments of the present disclosure, the electronic device may further include a control switch configured to perform signal transmission/reception with the USB interface and connected to the processor.

According to various embodiments of the present disclosure, the processor may include a wireless communication function processor configured to process the wireless communication function operation and an application processor configured to process the USB communication function operation; or an integrated processor configured to process the wireless communication function operation and the USB communication function operation.

According to an embodiment of the present disclosure, an electronic device may include a USB communication function operation related USB interface; a wireless communication function operation related communication interface; and a communication control module (or processor) for deactivating a USB communication function when the execution of a wireless communication function is requested or the wireless communication function is executed during USB communication function execution as an external electronic device is connected to the USB interface.

According to an embodiment of the present disclosure, an electronic device includes a USB communication function operation related USB interface; a wireless communication function operation related communication interface; and a communication control module (or processor) for, when the execution of the wireless communication function is requested or the wireless communication function is executed during USB communication function execution as an external electronic device is connected to the USB interface, releasing a connection between a main antenna included in the communication interface and disposed adjacent to the USB interface and a wireless signal processing component (for example, a transceiver) or disabling the main antenna operation and executing the wireless communication function based on a sub antenna included in the communication interface.

According to various embodiments of the present disclosure, the communication control module (or processor) may perform a control to maintain the USB communication function during a wireless communication function operation based on the sub antenna.

According to an embodiment of the present disclosure, an electronic device includes a USB communication function operation related USB interface; a wireless communication function operation related communication interface; and a communication control module for, when a wireless environment becomes a weak electric field state of less than a specified condition during USB communication function execution as an external electronic device is connected to the USB interface, releasing an electrical connection between a main antenna included in the communication interface and disposed adjacent to the USB interface and a communication device (for example, a transceiver, a receiver, and so on) or disabling a main antenna operation, and establishing a communication function related communication path between a sub antenna included in the communication interface and the communication device.

According to various embodiments of the present disclosure, when the weak electric field is changed to be a strong electric field state of greater than a specified condition, the communication control module may restore the main antenna operation.

According to an embodiment of the present disclosure, an electronic device includes a USB communication function operation related USB interface; a wireless communication function operation related communication interface; and a communication control module for, when a wireless environment becomes a weak electric field state of less than a specified condition during USB communication function execution as an external electronic device is connected to the USB interface, outputting a screen for terminating the USB communication function and a screen for releasing an electrical connection between a main antenna included in the communication interface and disposed adjacent to the USB interface and a communication device (for example, a transceiver, a receiver, and so on) or disabling a main antenna operation, and establishing a wireless communication function related communication path between a sub antenna included in the communication interface and the communication device.

According to an embodiment of the present disclosure, an electronic device may include a USB communication function operation related USB interface; a wireless communication function operation related communication interface; and a communication control module for, when a wireless environment becomes a weak electric field state of less than a specified condition during USB communication function execution as an external electronic device is connected to the USB interface, terminating the USB communication function.

According to an embodiment of the present disclosure, an electronic device may include a USB communication function operation related USB interface; a wireless communication function operation related communication interface; and a communication control module for, when a wireless environment becomes a weak electric field state of less than a specified condition during USB communication function execution as an external electronic device is connected to the USB interface, outputting a screen for terminating the USB communication function.

Figure 7:
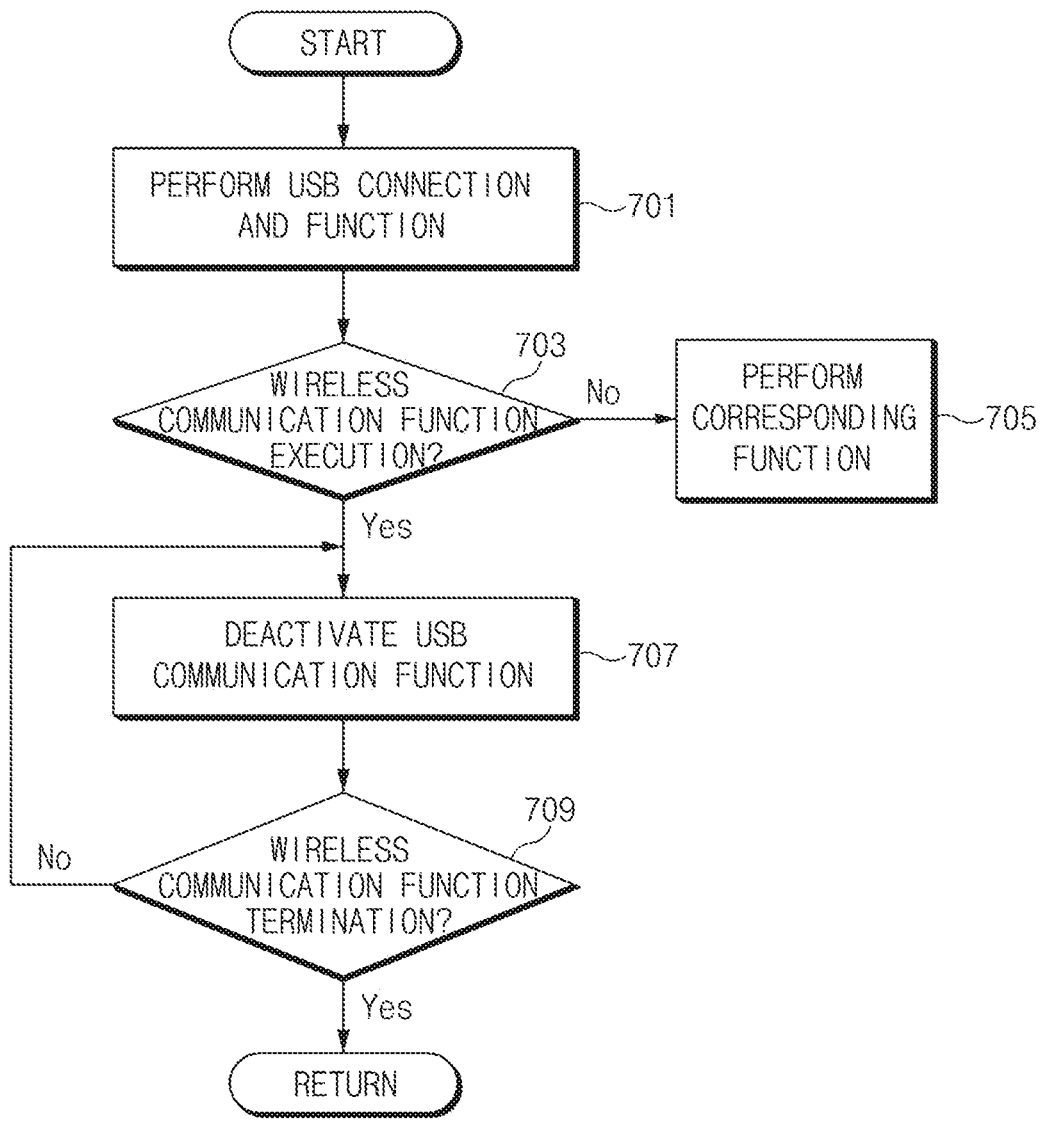
FIG. 7 is a view illustrating a universal serial bus (USB) communication function operating method of an electronic device depending on a wireless communication function according to an embodiment of the present disclosure.

FIG. 7 is a view illustrating a USB communication function operating method of an electronic device depending on a wireless communication function according to an embodiment of the present disclosure.

Referring to FIG. 7, in relation to a USB communication function operating method of an electronic device according to an embodiment of the present disclosure, in operation 701, the electronic device 100 performs USB connection with the external electronic device 102 and performs a USB communication function. The USB communication function, for example, may include control data transmission/reception associated with USB communication channel establishment according to the connection of the external electronic device 102, transmission/reception of control data for USB communication based data transmission, transmission/reception of USB data (for example, data generated to be transmitted/received in a USB method), and transmission/reception of USB display data (for example, data generated in a specified format in relation to a screen display among data transmitted/received in a USB method). The USB communication function, for example, may be performed based on signal transmission/reception between the electronic device 100 and the external electronic device 102.

In operation 703, the electronic device 100 may check whether to execute a wireless communication function. The wireless communication function, for example, may include at least one of a voice call function, a video call function, and a data communication function. Alternatively, the wireless communication function may include a data communication based voice call function or a data communication based video call function. Alternatively, the wireless communication function may include a function for transmitting a text or an image (for example, an image of a picture or a video) through SNS. Alternatively, the wireless communication function, for example, may include a broadcast signal reception function. In relation to this, the communication interface 170 may include a broadcast function related broadcast communication module.

If there is no event occurrence associated with the wireless communication function, in operation 705, the electronic device 100 may perform a corresponding function (for example, a scheduled function or a requested function). The scheduled function, for example, may include a function according to a user setting or input and a function according to a timer setting. Alternatively, the scheduled or requested function may include a data transmission/reception function based on the USB interface 180.

When wireless communication function execution is requested, in operation 707, the electronic device 100 may deactivate a USB communication function. For example, the electronic device 100 may release a USB communication channel according to an operation of the control switch 185 described with reference to FIG. 4 and deactivate (pause or terminate) a USB communication function. Alternatively, the electronic device 100 may release a USB communication channel according to a control of the AP 121 or the integrated processor 123, and deactivate a USB communication function. The electronic device 100 may process wireless communication function execution in addition to USB communication function deactivation. For example, when receiving a voice call connection request, the electronic device 100 may deactivate a USB communication function in execution and perform voice call connection. The voice call connection request, for example, may be a call connection request from the external electronic device 102 or a call connection request according to a user input of the electronic device 100.

In operation 709, the electronic device 100 may check whether a wireless communication function termination related event occurs. When a wireless communication function is not terminated, the electronic device 100 may branch into operation 707 to maintain a USB communication function deactivation state and a wireless communication function.

When the wireless communication function is terminated, the electronic device 100 may return to a function according to a specified setting. For example, the electronic device 100 may automatically activate a USB communication function that is deactivated according to wireless communication function execution. Alternatively, the electronic device 100 may output a list of at least one USB communication function, which is deactivated according to wireless communication function execution, to the display 160. Alternatively, the electronic device 100 may output a pop-up window for asking whether to re-execute a deactivated USB communication function. Alternatively, the electronic device 100 may support a function re-execution related function. When a deactivated USB communication function item is selected, the electronic device 100 may perform a control to activate a USB communication function corresponding to the selected item. During this operation, the electronic device 100 may proceed to the next process continuously after a process performed immediately before deactivation. For example, the electronic device 100 may perform a control to transmit/receive the next data continuous to previously transmitted/received data.

Figure 8:
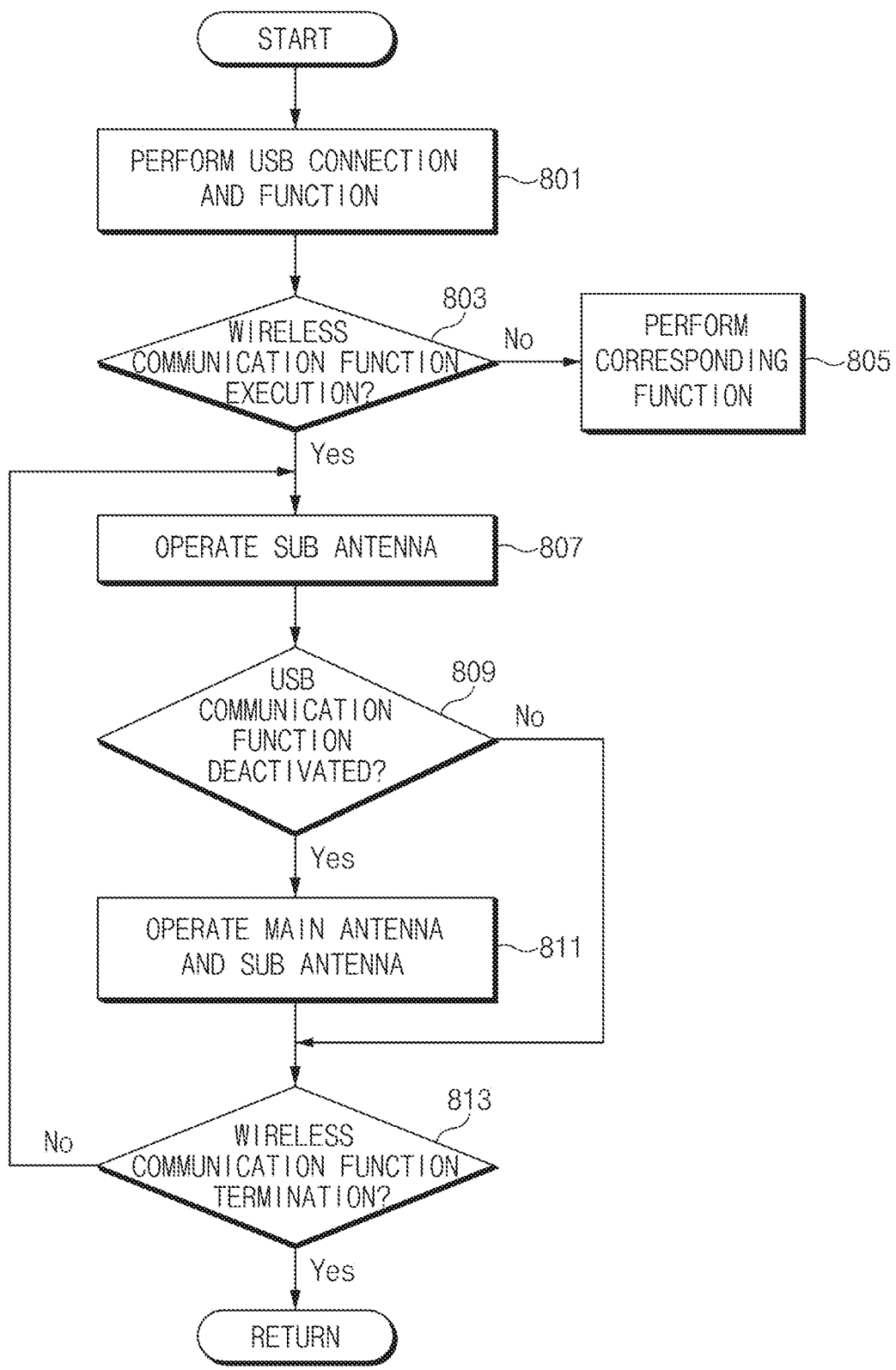
FIG. 8 is a view illustrating an antenna operating method of an electronic device depending on a wireless communication function according to an embodiment of the present disclosure.

FIG. 8 is a view illustrating an antenna operating method of an electronic device depending on a wireless communication function according to an embodiment of the present disclosure.

Referring to FIG. 8, in relation to an antenna operating method of an electronic device according to an embodiment of the present disclosure, in operation 801, the electronic device 100 performs USB connection with the external electronic device 102 and performs a USB communication function. The USB communication function, for example, may include a USB data transmission function performed at a specified first data transmission speed and a USB display data transmission function performed at a specified second data transmission speed.

In operation 803, the electronic device 100 may check whether to execute a wireless communication function. The wireless communication function, for example, may include a voice call function, a video call function, and a data communication function. The checking of whether to execute the wireless communication function may be performed through wireless communication function execution related event occurrence. The event, for example, may include a message transmission/reception event for requesting call connection and a data communication channel establishment related message transmission/reception event. According to various embodiments of the present disclosure, the event, for example, may include a phonebook execution event, a wireless communication function application (for example, a voice call application, a data communication application, and so on) execution request event, and a wireless communication function application execution event.

If there is no event occurrence associated with the wireless communication function, in operation 805, the electronic device 100 may perform a corresponding function (for example, a scheduled function or a requested function). The scheduled or requested function may include a USB communication function in execution in operation 801. Alternatively, the scheduled or requested function may include a function (for example, a file search function and a picture capturing function) requested according to a user input.

When the wireless communication function execution related event occurs, the electronic device 100 may process a sub antenna operation in relating to wireless communication function execution in operation 807. During this operation, the electronic device 100 may process a main antenna to be electrically isolated. For example, the electronic device 100 may control a switch to allow a main antenna connected to the transceiver 171 through the switch to be disconnected from a transceiver.

In operation 809, the electronic device 100 may check whether a USB communication function is deactivated while a wireless communication function operates based on a sub antenna. For example, the electronic device 100 may check whether a USB communication function deactivation related user input event, a USB communication function deactivation related scheduling event (for example, communication function termination by USB data transmission completion), or USB communication function deactivation related message reception event from the external electronic device 102 occurs.

When a USB communication function is deactivated during a wireless communication function operation, in operation 811, the electronic device 100 may operate a main antenna and a sub antenna. For example, the electronic device 100 may establish an electrical connection of a main antenna by controlling a switch. The electronic device 100 may perform better signal collection and processing based on a signal received through a main antenna and a sub antenna.

When a USB communication function maintains an activation state during a wireless communication function operation, the electronic device 100 may skip operation 811. For example, the electronic device 100 may maintain a disconnected state of a main antenna and perform a sub antenna based wireless communication function operation.

In operation 813, the electronic device 100 may check whether a wireless communication function termination related event occurs. When a wireless communication function is not terminated in a state that a USB communication function is maintained, the electronic device 100 may branch into operation 807 to perform a sub antenna operation (that is, maintain a disconnected state of a main antenna). When a wireless communication function is not terminated in a state that a USB communication function is deactivated, the electronic 100 may branch into operation 811 to operate a main antenna and a sub antenna.

When a wireless communication function is terminated, the electronic device 100 may return to a specified function state. For example, when a wireless communication function is terminated in a state that a USB communication function is maintained, the electronic device 100 may maintain an activation state of the USB communication function. When a wireless communication function is terminated in a state that a USB communication function is deactivated, the electronic device 100 may output a specified function screen, for example, a home screen, or a function screen executed immediately before USB communication function execution. According to various embodiments of the present disclosure, the electronic device 100 may output deactivated USB communication function lists or automatically activate at least one specific USB communication function in a deactivated USB function list. During this operation, the electronic device 100 may check a connection state with the external electronic device 102 through a USB connector. When the external electronic device 102 is connected based on a USB connector, the electronic device 100 may automatically re-execute a USB communication function. When the external electronic device 102 is disconnected, the electronic device 100 may output information corresponding to the disconnected state of the external electronic device 102 to at least one of a display and an audio device. When the external electronic device 102 is disconnected, the electronic device 100 may output a list of USB communication functions that are deactivated by a wireless communication function.

Figure 9:
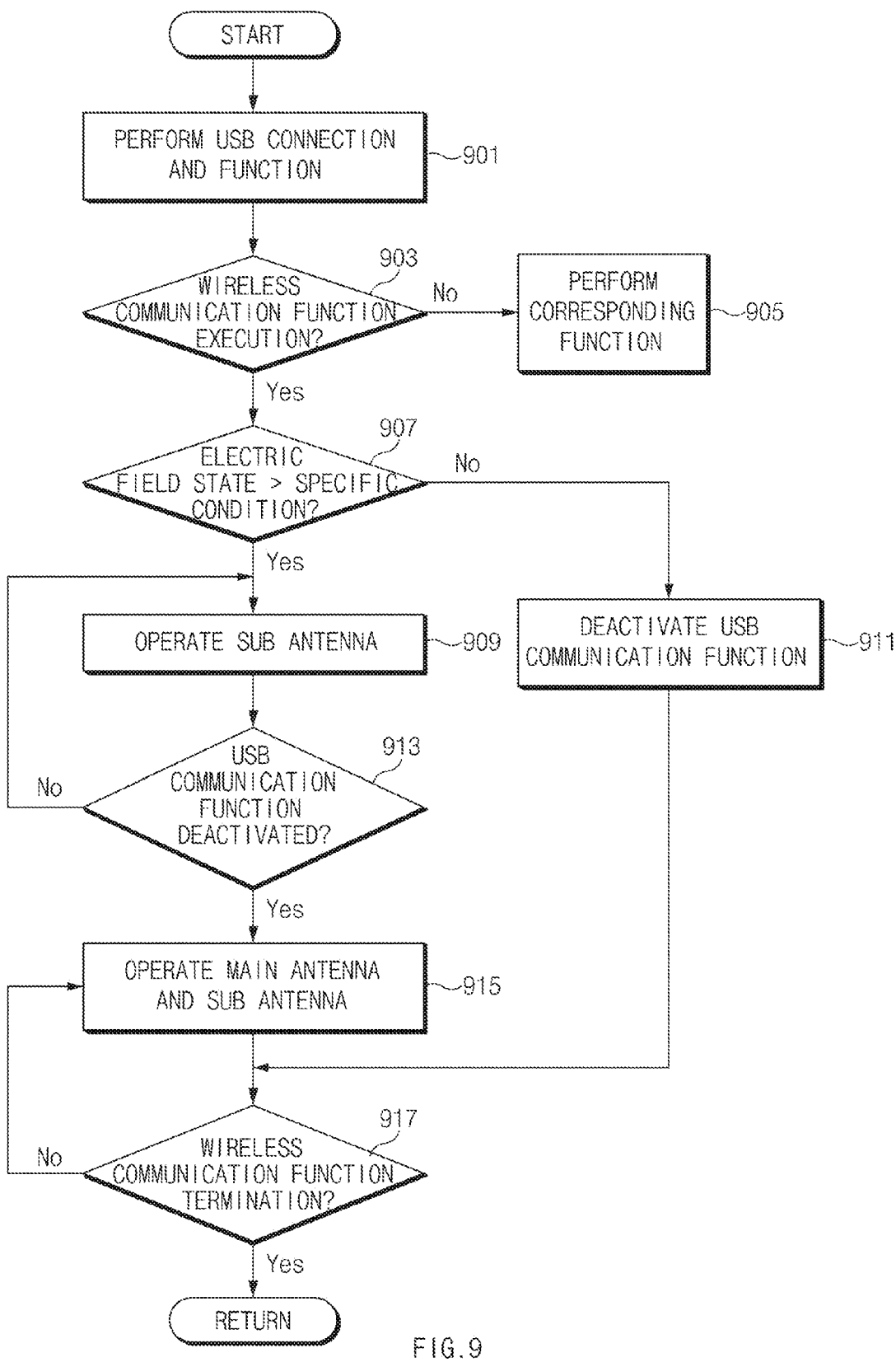
FIG. 9 is a view illustrating an electronic device operating method depending on an electric field state according to an embodiment of the present disclosure.

FIG. 9 is a view illustrating an electronic device operating method depending on an electric field state according to an embodiment of the present disclosure.

Referring to FIG. 9, in relation to an electronic device operating method depending on an electric field state, the electronic device 100 may perform USB connection and a USB communication function in operation 901.

In operation 903, the electronic device 100 may check whether a wireless communication function execution related event occurs. If there is no event occurrence associated with the wireless communication function, in operation 905, the electronic device 100 may perform a corresponding function (for example, a scheduled function or a function according to a user input).

If the wireless communication function execution related event occurs, the electronic device 100 may check whether an electric field state is greater than a specific condition in operation 907. The specific condition with respect to an electric field state, for example, may include a wireless signal reception intensity indicated in relation to a wireless environment, a data transmission rate, a data transmission error rate, a data transmission speed, and a condition that a value indicated by system information provided from a base station has a set value. Alternatively, the specified condition with respect to an electric field state may include statistical or experimental conditions for changing a USB communication function in relation to a wireless environment state. For example, the specified condition may include a condition that a wireless signal reception intensity has a specified value (or range) and a condition that a data transmission error rate has a specified value (or range).

If an electric field state is greater than a specified condition, in operation 909, the electronic device 100 may control a sub antenna operation. If an electric field state is less than a specified condition, in operation 911, the electronic device 100 may control USB communication function deactivation.

In operation 913, the electronic device 100 may check whether a USB communication function deactivation request occurs.

If there is no USB communication function deactivation request, the electronic device 100 may branch into operation 909 to maintain a sub antenna operation. If a wireless communication function is terminated during the maintaining of the sub antenna operation, the electronic device 100 may branch into operation 907 and perform subsequent operations again.

When a USB communication function is deactivated according to a USB communication function deactivation request, in operation 915, the electronic device 100 may control main antenna and sub antenna operations.

In operation 917, the electronic device 100 may check whether a wireless communication function termination related event occurs. If there is no wireless communication function termination related event, the electronic device 100 may branch into operation 915 to maintain an operating state below (for example, a wireless communication function maintaining state). When the wireless communication function is terminated, the electronic device 100 may branch into operation 901 to perform a USB communication function performance related control.

Figure 10:
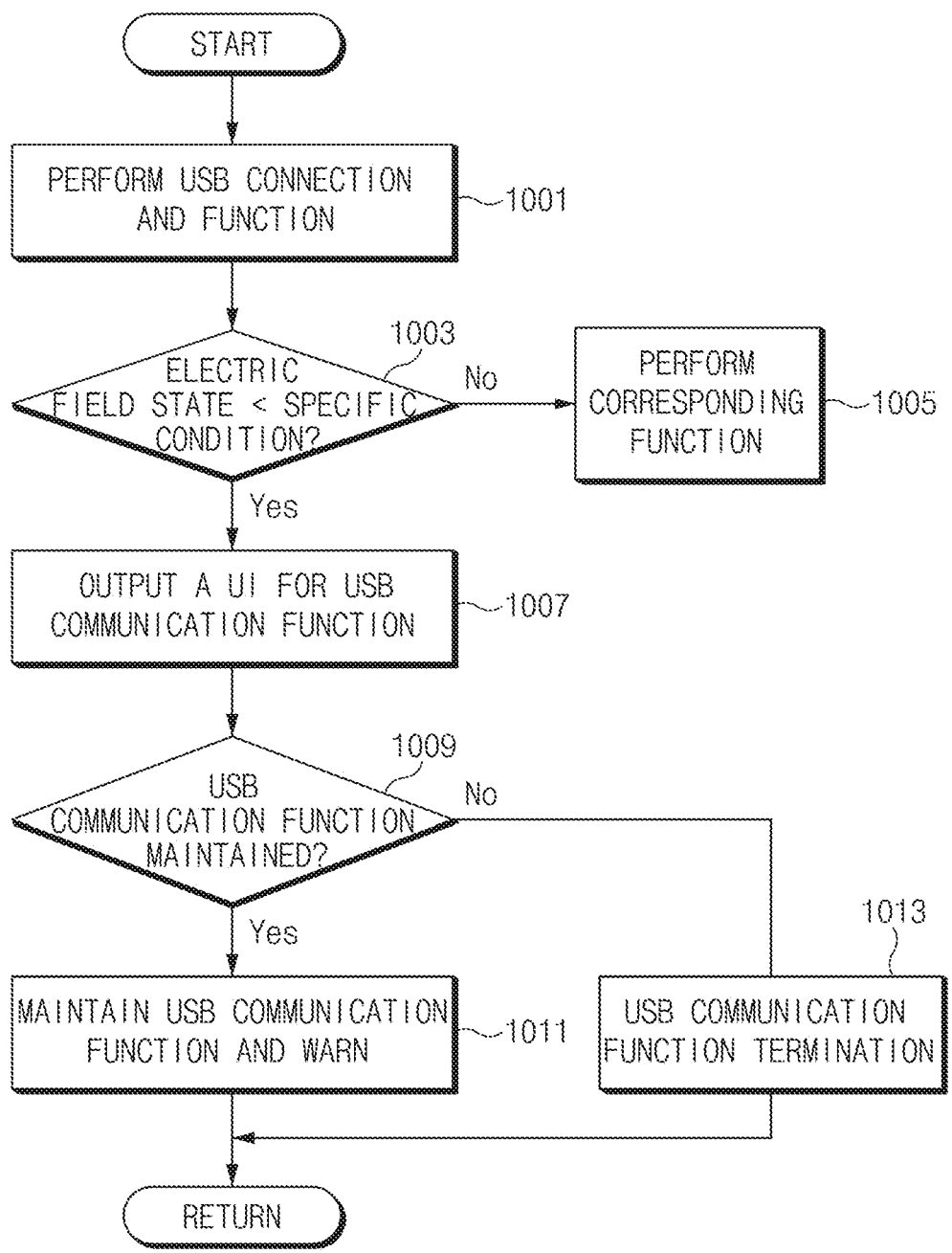
FIG. 10 is a view illustrating a screen interface operating method of an electronic device according to an embodiment of the present disclosure.

FIG. 10 is a view illustrating a screen interface operating method of an electronic device according to an embodiment of the present disclosure.

Referring to FIG. 10, in relation to an electronic device screen interface operating method, the electronic device 100 may process USB connection and function performance in operation 1001.

In operation 1003, the electronic device 100 may check whether an electric field state is less than a specified condition. When an electric field state is greater than a specified condition (for example, an index for representing a wireless state is better than a specified condition like a case that a wireless signal reception intensity is greater than a specified size or a data transmission error rate is less than a specified value), in operation 1005, the electronic device 100 may process a corresponding function (for example, a scheduled function or a function according to a user input). For example, the electronic device 100 may maintain the USB communication function performed in operation 901.

When an electric field state is less than a specified condition (for example, a wireless signal reception intensity is less than a specified size, a data transmission error rate is greater than a specified value, or a data transmission speed is less than a specified value), in operation 1007, the electronic device 100 may output a USB communication function control UI.

In operation 1009, the electronic device 100 may check whether an input event associated with function maintenance (for example, USB communication function maintenance) occurs. When the function maintenance related input event occurs, the electronic device 100 may perform USB communication function maintenance and warning in operation 1011. For example, the electronic device 100 may output a warning (for example, text, image, audio, and so on) that a wireless communication function is not performed normally according to the USB communication function maintenance.

When a function termination (for example, USB communication function termination) related event occurs, the electronic device 100 may perform USB communication function termination in operation 1013. During this operation, the electronic device 100 may transmit, to the external electronic device 102, a message for guiding USB communication function termination. The electronic device 100 may store terminated USB communication function execution information (for example, the amount of data transmitted according to a USB communication function, or the amount of unsent data, and a start position of unsent data in content (for example, time information of unsent data based on content playback time information or start frame position information of unsent frames among the entire frames of content)) according to a setting.

When an electric field state is changed to be greater than a specified condition after a USB communication function is terminated according to a user input or a setting, the electronic device 100 may re-execute a USB communication function. Alternatively, the electronic device 100 may perform a USB communication function re-execution related screen output.

Figure 11:
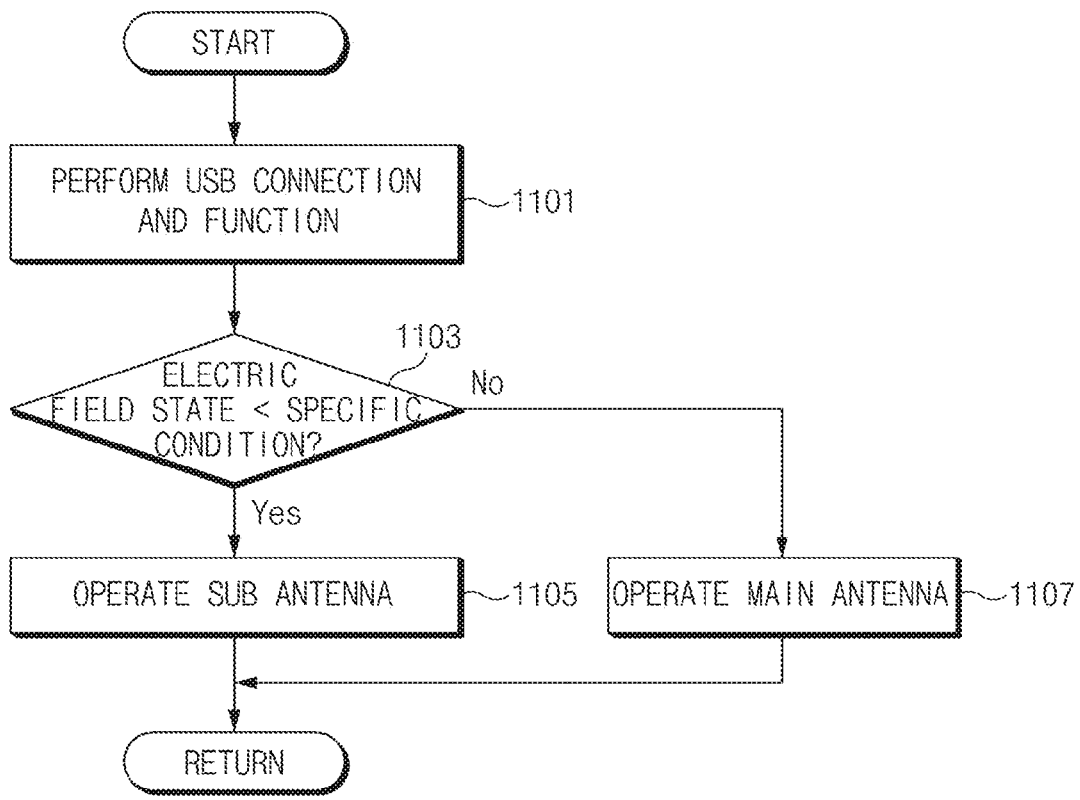
FIG. 11 is a view illustrating an antenna operating method depending on an electric field state according to an embodiment of the present disclosure.

FIG. 11 is a view illustrating an antenna operating method depending on an electric field state according to an embodiment of the present disclosure.

Referring to FIG. 11, in relation to an antenna operating method depending on an electric field state, the electronic device 100 may process USB connection and function performance in operation 1101. For example, when the external electronic device 102 is connected through the USB interface 180, the electronic device 100 may recognize the connection of the external electronic device 102. The electronic device 100 may check the type of the external electronic device 102 based on message transmission/reception with the external electronic device 102. The electronic device 100 may automatically perform a USB communication function to be executed in correspondence to the type of the external electronic device 102 or output a list of USB communication functions to be executed. When a USB communication function execution related event occurs, the electronic device 100 may transmit/receive specified data to/from the external electronic device 102.

In operation 1103, the electronic device 100 may check whether an electric field state is less than a specific condition. For example, when a peripheral wireless situation is poor, that is, less than a specified size, the electronic device 100 may check whether a wireless signal reception intensity is less than a specified size. When an electric field state is greater than a specified condition, in operation 1105, the electronic device 100 may control a sub antenna operation. In relation to this, the electronic device 100 may control a transceiver connection state of a main antenna to be disconnected. If an electric field state is less than a specified condition, in operation 1107, the electronic device 100 may control a main antenna operation. During this operation, the electronic device 100 may operate a main antenna and a sub antenna at the same time by maintaining the connection of the sub antenna.

When an electric field state is changed, the electronic device 100 may re-adjust an antenna operating state. For example, as an electric field state is changed in an electric field defective state so that an electric field situation is changed to be greater than a specified condition, the electronic device 100 may perform connection with a disconnected main antenna and operate the communication interface 170 according to a main antenna operation. Alternatively, as an electric field state is changed in an electric field normal state so that an electric field situation is changed to be less than a specified condition, the electronic device 100 may perform the disconnection of a main antenna and control a sub antenna operation.

As mentioned above, according to an embodiment of the present disclosure, an electronic device operating method may include executing a USB communication function; receiving the wireless communication function execution request during the USB communication function execution; and deactivating the USB communication function according to a type of the USB communication function.

According to various embodiments of the present disclosure, the method may further include executing the wireless communication function after the deactivating of the USB communication function.

According to various embodiments of the present disclosure, the deactivating of the USB communication function may include checking whether a transmission speed of the USB communication function is greater than a specified transmission speed and deactivating the USB communication function in correspondence to the wireless communication function execution request in the case of the USB communication function of greater than the specified transmission speed.

According to various embodiments of the present disclosure, the method may further include maintaining the USB communication function in correspondence to the wireless communication function execution request in the case of the USB communication function of less than the specified transmission speed.

According to various embodiments of the present disclosure, the deactivating of the USB communication function may include checking whether the USB communication function is a USB display data transmission function for transmitting an image; and when the USB communication function is the USB display data transmission function, deactivating the USB communication function in correspondence to the wireless communication function execution request.

According to various embodiments of the present disclosure, the method may further include receiving the wireless communication function termination related event; and re-executing the deactivated USB communication function according to the wireless communication function termination or outputting the deactivated USB communication function list.

According to various embodiments of the present disclosure, the deactivating of the USB communication function may include receiving at least one of a wireless communication function execution related connection request, a wireless communication function execution related user input, and a wireless communication function execution setting related request from the outside; and deactivating the USB communication function according to the request reception.

According to various embodiments of the present disclosure, the method may further include receiving the wireless communication function termination related event; checking USB connection of an external electronic device; and when the USB connection is maintained, re-executing the deactivated USB communication function and when the USB connection is released, outputting the deactivated USB communication function list.

According to various embodiments of the present disclosure, the method may further include at least one of when the wireless communication function execution request occurs, outputting a screen for selecting whether to maintain the USB communication function or whether to deactivate the USB communication function; and when the wireless communication function execution request occurs, outputting guide information for guiding the deactivation of the USB communication function.

As mentioned above, an electronic device operating method according to an embodiment of the present disclosure may include executing a USB communication function; when a wireless environment enters a weak electric field of a specified condition during the execution of the USB communication function; outputting a USB communication function termination control related screen; or establishing a wireless communication operating path including a sub antenna at a position spaced greater than a specified distance from a USB interface (for example, establishing a communication path including a sub antenna).

As mentioned above, an electronic device operating method according to an embodiment of the present disclosure may include when wireless communication function execution is requested during the execution of a USB communication function or when the execution of the USB communication function is requested during the performance of the wireless communication function, deactivating the USB communication function or executing the wireless communication function through a sub antenna at a position spaced greater than a specified distance from the USB interface.

The method may include receiving the wireless communication function execution request and deactivating the USB communication function.

Figure 12:
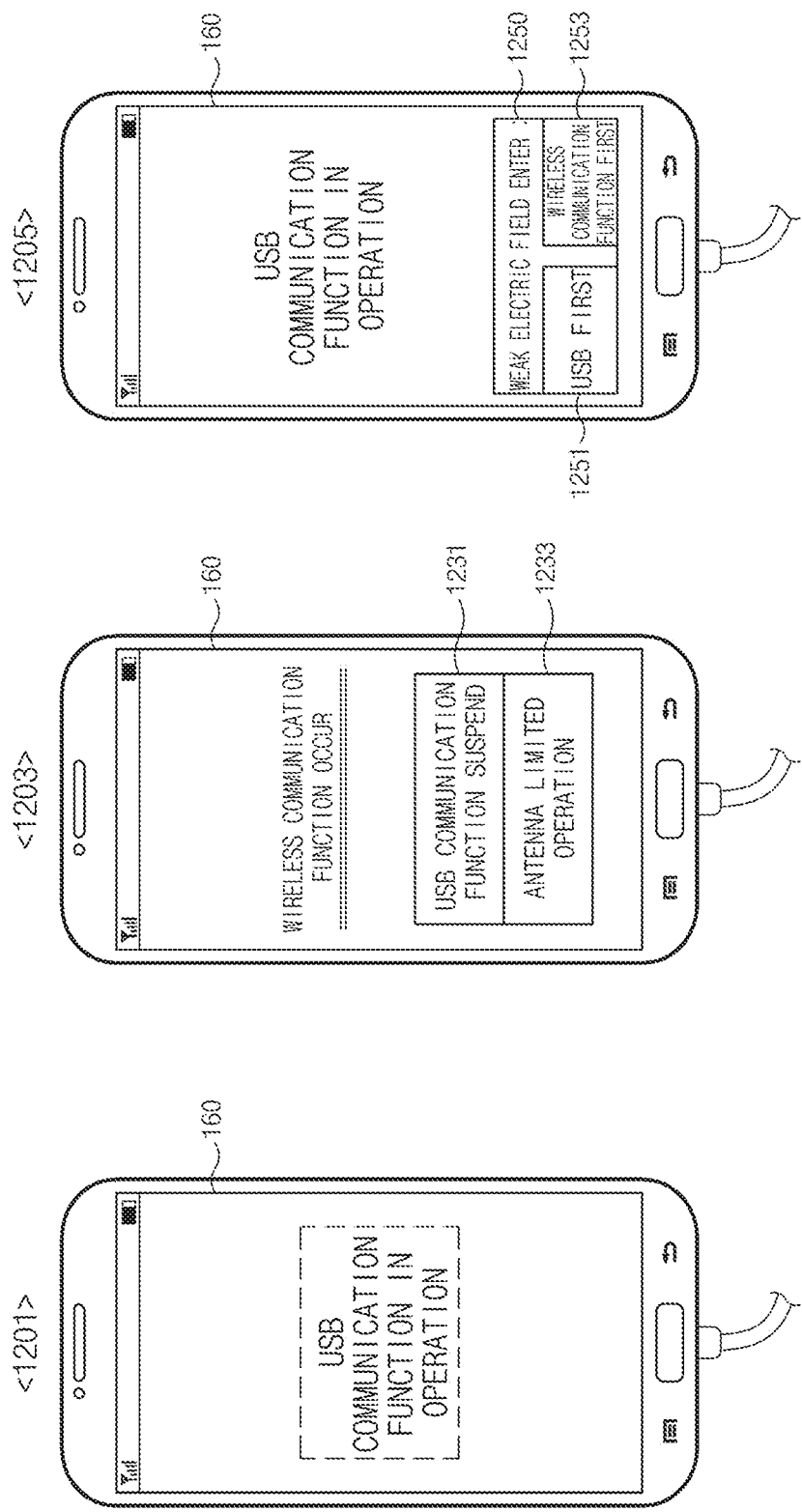
FIG. 12 is a view illustrating a screen interface of an electronic device according to an embodiment of the present disclosure.

FIG. 12 is a view illustrating a screen interface of an electronic device according to an embodiment of the present disclosure.

Referring to FIG. 12, when an external electronic device is connected through the USB interface of the electronic device 100, the electronic device 100, as shown in a screen 1201, may output at least one of a text and an image associated with a USB communication function operation. For example, when an external electronic device is connected to the USB interface, the electronic device 100 may output, to the display 160, guide information (for example, at least one of text, image, audio, and vibration) for guiding the external electronic device connection. The electronic device 100 may determine the type (for example, a class for performing a USB data transmission function, a class for performing a USB display data transmission function, and an accessory class for transmitting/receiving data through a USB interface without performing a USB function) of an external electronic device. The electronic device 100 may output type information of an external electronic device and output a list of functions performed based on the external electronic device. According to various embodiments of the present disclosure, the electronic device 100 may store and manage a connection history of an external electronic device and execute a USB communication function that is automatically specified according to a connection history when a specified external electronic device is connected. During this operation, the electronic device 100 may output guide information associated with an automatically executed USB communication function.

When a request associated with the execution of a wireless communication function (for example, a call function or a data communication function) of the electronic device 100 occurs in the time that a USB communication function of the electronic device 100 is performed, the electronic device 100, as shown in a screen 1203, may output guide information corresponding to a wireless communication function execution request.

According to an embodiment of the present disclosure, the electronic device 100 may output a first virtual key button 1231 for pausing a USB communication function in relation to wireless communication function execution and a second virtual key button 1233 for performing an antenna limited operation. When an input event associated with the selection of the first virtual key button 1231 occurs, the electronic device 100 may pause a USB function and process wireless communication function execution. During this operation, the electronic device 100 may operate a main antenna and a sub antenna at the same time to support a wireless communication function. When an input event associated with the selection of the second virtual key button 1233 occurs, the electronic device 100 may perform a control to process a wireless communication function based on a sub antenna. During this operation, the electronic device 100 may perform a control to block a connection between a main antenna and a transceiver. When a wireless communication function is terminated, the electronic device 100 may perform a control to restore a connection between a main antenna and a transceiver or maintain a disconnected state according to a setting.

According to various embodiments of the present disclosure, the electronic device 100 may collect information on an electric field situation during USB communication function performance. For example, the electronic device 100 may check whether an electric field situation is greater than a specified condition by collecting wireless signal reception intensity information, a data transmission rate, a data transmission error rate, a data transmission speed, and system information provided by a base station. When an electric field situation is changed to be less than a specified condition according to a position or a peripheral environment change, the electronic device 100 may determine this as a weak electric field entry. In this case, the electronic device 100, as shown in a screen 1205, may output guide information 1250 on the weak electric field entry. The guide information 1250, for example, may include a USB first item 1251 and a wireless communication function first item 1253. If there is an event or setting associated with the selection of the USB first item 1251, the electronic device 100 may perform a control to maintain a USB communication function.

According to an embodiment of the present disclosure, when the USB first item 1251 is selected, the electronic device 100 may perform a control to release the connection with a main antenna and operate a sub antenna based wireless communication function.

According to various embodiments of the present disclosure, the electronic device 100 may guide that a wireless communication function may not be performed normally according to USB communication function maintenance. If there is an event or setting associated with the selection of the wireless communication function first item 1253, the electronic device 100 may pause or terminate a USB communication function. The electronic device 100 may guide that a USB communication function is in an inactivation state due to weak electric field entry. When a weak electric field situation is changed and becomes a strong electric field situation, the electronic device 100 may output guide information for guiding that an inactivated USB communication function is executable. Alternatively, the electronic device 100 may automatically re-execute an inactivated USB communication function.

The USB communication function of the present disclosure may determine a connected device by recognizing a signal slope according to a terminal resistance of a reception path after a cable and an accessory device contact or by using a chip configuration (CC) when Type C is applied. The electronic device may operate normally in a specified state (for example, a UO state) when there is no additional issue through a Polling stage relating to a USB function operation after USB contact and detection. In this case, the electronic device transmits 5 Gbps data signals and a 5 Gbps signal component forms a field in the entire paths of USB.

According to an embodiment of the present disclosure, when a wireless communication function (for example, a call) occurs during USB communication between an AP and a transmitter, an electronic device may remove noise itself by disabling a main antenna through a logic circuit (for example, the logic circuit of FIG. 3B) in a general-purpose input/output (GPIO) of a transceiver or a chip and may use a sub antenna exclusively during USB communication.

An electronic device according to an embodiment of the present disclosure may mirror a screen as it is (for example, transmit a screen to an external device) during phone function use and when receiving a call, release USB connection. The electronic device may pause a display screen in the case of video playback and play the display screen after the call end. The electronic device may mirror a voice call screen during audio playback and play the voice call screen after the call end.

According to an embodiment of the present disclosure, when an electronic receives a call or uses an RF function by making a call, an AP may recognize a wireless communication function execution request through a high speed inter chip (HSIC), a low latency interface (LLI), or a peripheral component interconnect express (PCIe) Interface, or an integrated processor may recognize a wireless communication function execution request through an internal logic. In this case, the electronic device disables USB data signals through a register in an AP or a logic circuit. In a case that an external switch (for example, the control switch) is used, when USB data signals are lost in an AP, an electronic device may perform a power save mode. When not using an external switch, an electronic device may solve a noise issue relating to a wireless communication function as an AP disables USB data connection.

The electronic device of the present disclosure may provide various embodiments in relation to a USB communication function operation. For example, an AP of an electronic device may recognize the use relating to a wireless communication function operation. When a wireless communication function operation is requested, the AP may disable USB data and enable USB data when a wireless communication function (for example, an RF function) is not used. Alternatively, when a wireless communication function operation is requested, the AP may allow a USB switch (or multiplex (MUX)) (for example, the control switch) to disable USB data and when a wireless communication function is not used, allow the USB switch (or MUX) to enable the USB data again. When a wireless communication function operation is requested, the AP may disable a main antenna and enable only a sub antenna through an IC internal logic circuit (for example, the logic circuit of FIG. 3B).

According to an embodiment of the present disclosure, when a wireless environment enters a weak electric field during the use of USB interface (I/F) or USB I/F is to be used in a weak electric field, the AP may provide a message for asking whether to use a USB communication function to a user and disable AP USB data according to a user selection. According to an embodiment of the present disclosure, when an electronic device enters an RF weak electric field during the use of USB I/F or USB I/F is to be used in a weak electric field, the AP may provide a message for asking whether to use a USB communication function to a user and disable USB data of a switch (or MUX) (for example, the control switch) according to a user selection. According to an embodiment of the present disclosure, when a call occurs during USB display, after or before an AP internal ⅓ or ¼ compression or un-compression data processing process, the AP 121 may disable or hold a USB display signal itself of the AP 121 through a logic circuit and enable the USB display signal after the call end. According to an embodiment of the present disclosure, when a call occurs during USB display, after or before an AP internal ⅓ or ¼ compression or un-compression data processing process, the AP 121 may disable or hold a USB display signal of a switch (for example, the control switch) through a logic circuit and enable the USB display signal after the call end. According to an embodiment of the present disclosure, the AP 121 may provide related information to a user before disabling a USB data signal and when using a wireless communication function, support a user to determine USB data signal enable/disable.

Figure 13:
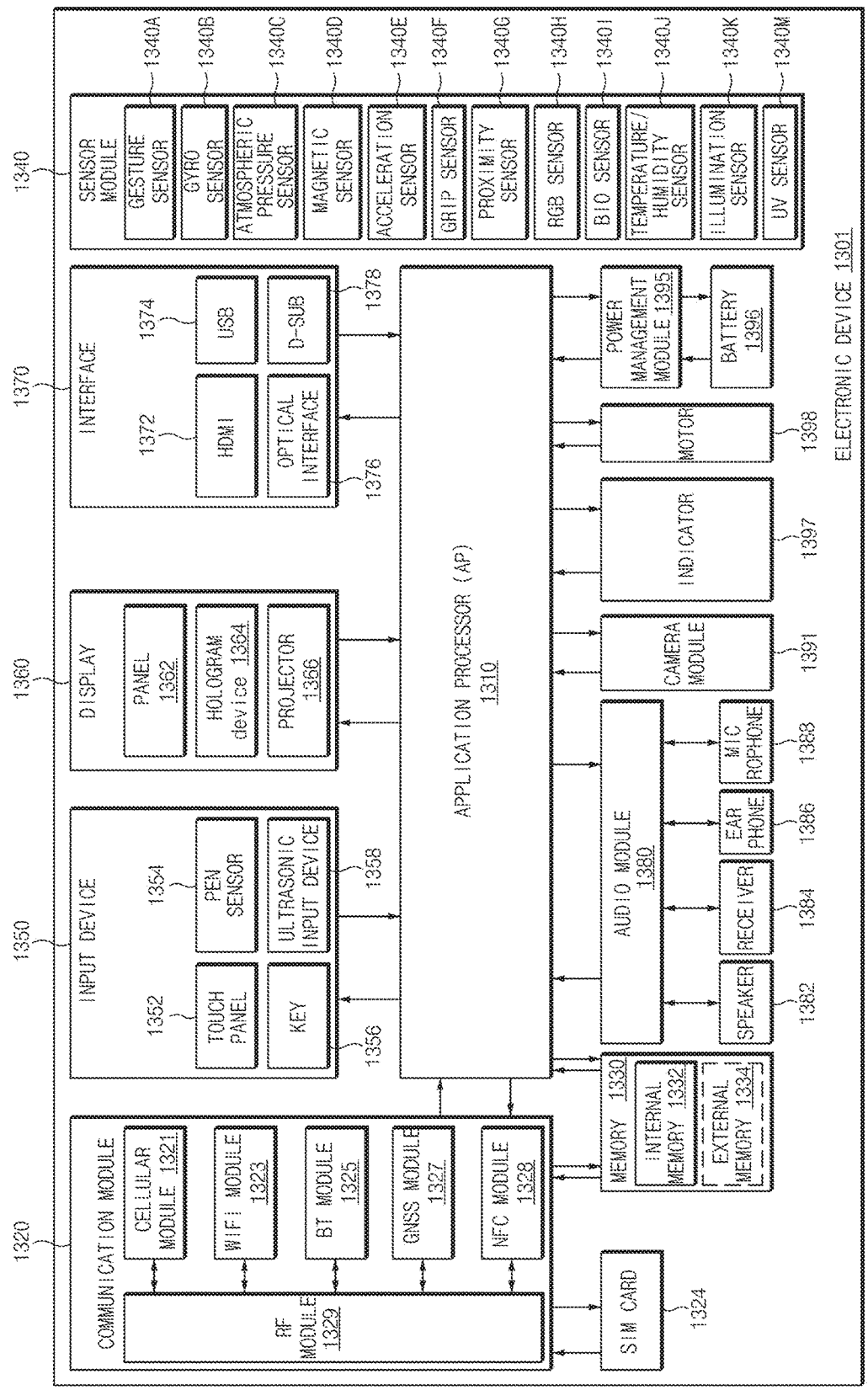
FIG. 13 is a block diagram illustrating an electronic device according to various embodiments of the present disclosure.

FIG. 13 is a block diagram illustrating an electronic device according to various embodiments of the present disclosure.

The electronic device 1301, for example, may include all or part of the electronic device 100 shown in FIGS. 1, 2, and 3A. The electronic device 1301 may include at least one processor (for example, an AP) 1310, a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may control a plurality of hardware or software components connected thereto and also may perform various data processing and operations by executing an operating system or an application program. The processor 1310 may be implemented with a system on chip (SoC), for example. According to an embodiment of the present disclosure, the processor 1310 may further include a graphic processing unit (GPU) (not shown) and/or an image signal processor. The processor 1310 may include at least part (for example, the cellular module 1321) of components shown in FIG. 13. The processor 1310 may load commands or data received from at least one of other components (for example, nonvolatile memory) and process them and may store various data in a nonvolatile memory.

The communication module 1320 may have the same or similar configuration to the communication interface 170 of FIG. 2. The communication module 1320 may include a cellular module 1321, a Wi-Fi module 1323, a BT module 1325, a GNSS module 1327 (for example, a GPS module, a Glonass module, a Beidou module, or a Galileo module), an NFC module 1328, and a RF module 1329. The communication module 1320 may further include an MST module.

The cellular module 1321, for example, may provide voice call, video call, text service, or internet service through communication network. According to an embodiment of the present disclosure, the cellular module 1321 may perform a distinction and authentication operation on the electronic device 1301 in a communication network by using a SIM (for example, a SIM card) 1324. According to an embodiment of the present disclosure, the cellular module 1321 may perform at least part of a function that the processor 1310 provides. According to an embodiment of the present disclosure, the cellular module 1321 may include a CP.

Each of the Wi-Fi module 1323, the BT module 1325, the GNSS module 1327, and the NFC module 1328 may include a processor for processing data transmitted/received through a corresponding module. According to an embodiment of the present disclosure, at least part (for example, at least one) of the cellular module 1321, the Wi-Fi module 1323, the BT module 1325, the GNSS module 1327, and the NFC module 1328 may be included in one integrated chip (IC) or IC package.

The RF module 1329, for example, may transmit/receive communication signals (for example, RF signals). The RF module 1329, for example, may include a transceiver, a power amp module (PAM), a frequency filter, a low noise amplifier (LNA), or an antenna. According to another embodiment of the present disclosure, at least one of the cellular module 1321, the Wi-Fi module 1323, the BT module 1325, the GNSS module 1327, and the NFC module 1328 may transmit/receive RF signals through a separate RF module.

The SIM 1324, for example, may include a card including a SIM and/or an embedded SIM and also may include unique identification information (for example, an integrated circuit card identifier (ICCID)) or subscriber information (for example, an international mobile subscriber identity (IMSI)).

The memory 1330 (for example, the memory 130) may include an internal memory 1332 or an external memory 1334. The internal memory 1332 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and solid state drive (SSD)).

The external memory 1334 may further include flash drive, for example, compact flash (CF), secure digital (SD), micro Micro-SD, Mini-SD, extreme digital (xD), multi media card (MMC) or a memorystick. The external memory 1334 may be functionally and/or physically connected to the electronic device 1301 through various interfaces.

The electronic device may further include a security module. The security module, as a module having a relatively higher security level than the memory 1330, may be a circuit for securing safe data storage and protected execution environment. The security module may be implemented as a separate circuit and may include an additional processor. The security module, for example, may be in a detachable smart chip or a SD card or may include an embedded secure element (eSE) embedded in a fixed chip of the electronic device 1301. The security module may run on a different OS from the electronic device 1301. For example, it may run based on java card open platform (JCOP) OS.

The sensor module 1340 measures physical quantities or detects an operating state of the electronic device 1301, thereby converting the measured or detected information into electrical signals. The sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a biometric sensor 1340I, a temperature/humidity sensor 1340J, an illumination sensor 1340K, and an ultra violet (UV) sensor 1340M. Additionally or alternatively, the sensor module 1340 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one sensor therein. According to an embodiment of the present disclosure, the electronic device 1301 may further include a processor configured to control the sensor module 1340 as part of or separately from the processor 1310 and thus may control the sensor module 1340 while the processor 1310 is in a sleep state.

The input device 1350 may include a touch panel 1352, a (digital) pen sensor 1354, a key 1356, or an ultrasonic input device 1358. The touch panel 1352 may use at least one of capacitive, resistive, infrared, or ultrasonic methods, for example. The touch panel 1352 may further include a control circuit. The touch panel 1352 may further include a tactile layer to provide tactile response to a user.

The (digital) pen sensor 1354, for example, may include a sheet for recognition as part of a touch panel or a separate sheet for recognition. The key 1356 may include a physical button, an optical key, or a keypad, for example. The ultrasonic input device 1358 may detect ultrasonic waves generated from an input tool through a microphone (for example, the microphone 1388) in order to check data corresponding to the detected ultrasonic waves.

The display 1360 (for example, the display 160) may include a panel 1362, a hologram device 1364, or a projector 1366. The panel 1362 may have the same or similar configuration to the display 160 of FIG. 2. The panel 1362 may be implemented to be flexible, transparent, or wearable, for example. The panel 1362 and the touch panel 1352 may be configured with one module. The hologram device 1364 may show three-dimensional images in the air by using the interference of light. The projector 1366 may display an image by projecting light on a screen. The screen, for example, may be placed inside or outside the electronic device 1301. According to an embodiment of the present disclosure, the display 1360 may further include a control circuit for controlling the panel 1362, the hologram device 1364, or the projector 1366.

The interface 1370 may include a HDMI 1372, a USB 1374, an optical interface 1376, or a D-subminiature (sub) 1378 for example. The interface 1370, for example, may be included in the communication interface 170 shown in FIG. 2. Additionally or alternatively, the interface 1370 may include a mobile high-definition link (MHL) interface, a secure Digital (SD) card/multi-media card (MMC) interface, or an infrared data association (IrDA) standard interface.

The audio module 1380 may convert sound into electrical signals and convert electrical signals into sounds. At least some components of the audio module 1380, for example, may be included in the input/output interface 150 shown in FIG. 2. The audio module 1380 may process sound information inputted/outputted through a speaker 1382, a receiver 1384, an earphone 1386, or a microphone 1388.

The camera module 1391, as a device for capturing a still image and a video, may include at least one image sensor (for example, a front sensor or a rear sensor), a lens, an image signal processor (ISP), or a flash (for example, an LED or a xenon lamp).

The power management module 1395 may manage the power of the electronic device 1301. According to an embodiment of the present disclosure, the power management module 1395 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1396, or a voltage, current, or temperature thereof during charging. The battery 1396, for example, may include a rechargeable battery and/or a solar battery.

The indicator 1397 may display a specific state of the electronic device 1301 or part thereof (for example, the processor 1310), for example, a booting state, a message state, or a charging state. The motor 1398 may convert electrical signals into mechanical vibration and may generate vibration or haptic effect. Although not shown in the drawings, the electronic device 1301 may include a processing device (for example, a GPU) for mobile television (TV) support. A processing device for mobile TV support may process media data according to the standards such as digital multimedia broadcasting (DMB), digital video broadcasting (DVB), or mediaFLO™.

Figure 14:
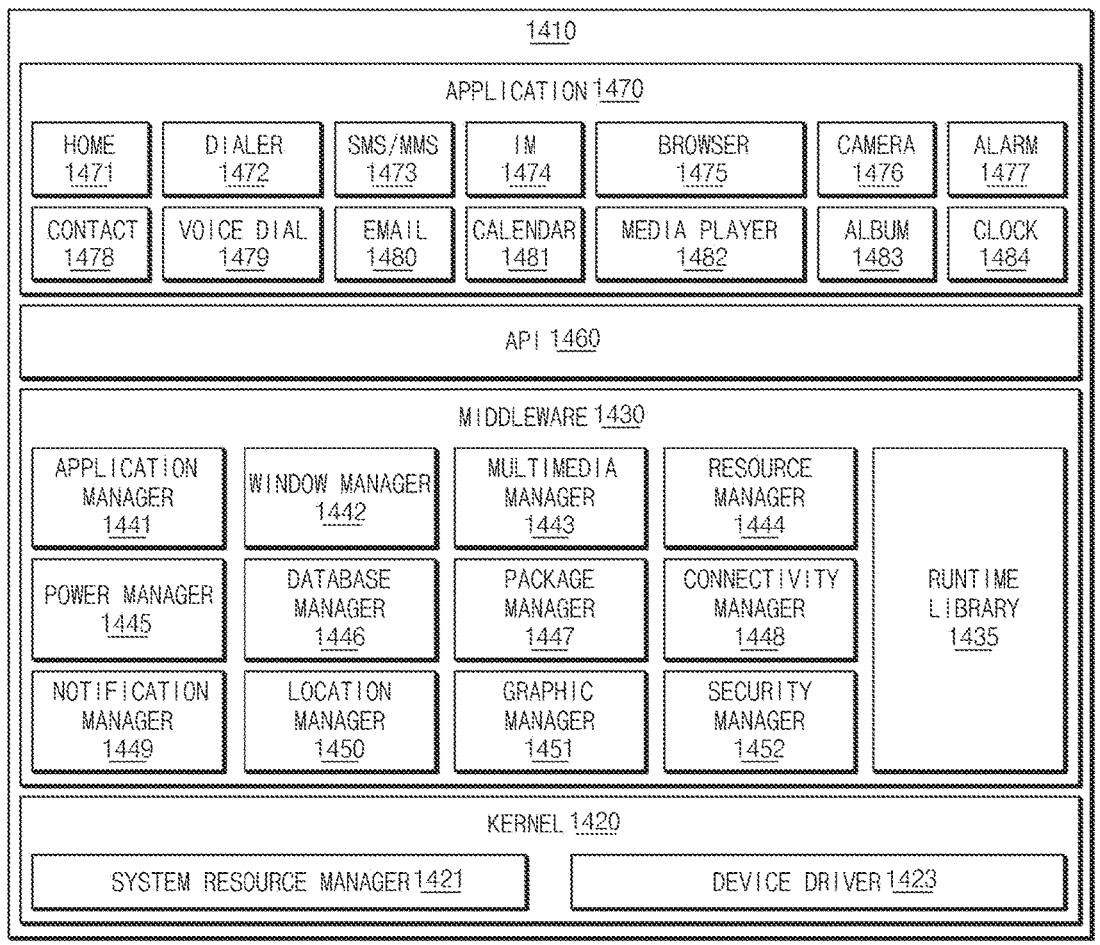
FIG. 14 is a block diagram illustrating a program module according to an embodiment of the present disclosure.

FIG. 14 is a block diagram illustrating a program module according to an embodiment of the present disclosure.

Referring to FIG. 14, a program module 1410 (for example, the program 140) may include an operating system (OS) for controlling a resource relating to an electronic device (for example, the electronic device 100) and/or various applications (for example, the application program 144) running on the OS. The OS, for example, may include android, iOS, windows, symbian, tizen, or bada.

The program module 1410 may include a kernel 1420, a middleware 1430, an API 1460, and/or an application program (or an application) 1470. At least part of the program module 1410 may be preloaded on an electronic device or may be downloaded from a server (for example, the electronic devices 102 and 104 and the server 106).

The kernel 1420 (for example, the kernel 141), for example, may include a system resource manager 1421, or a device driver 1423. The system resource manager 1421 may perform the control, allocation, or retrieval of a system resource. According to an embodiment of the disclosure, the system resource manager 1421 may include a process management unit, a memory management unit, or a file system management unit. The device driver 1423, for example, a display driver, a camera driver, a Bluetooth driver, a sharing memory driver, a USB driver, a keypad driver, a Wi-Fi driver, an audio driver, or an inter-process communication (IPC) driver.

The middleware 1430, for example, may provide a function that the application 1470 requires commonly, or may provide various functions to the application 1470 through the API 1460 in order to allow the application 1470 to efficiently use a limited system resource inside the electronic device. According to an embodiment, the middleware 1430 (for example, the middleware 142) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, and a payment manager 1454.

The runtime library 1435, for example, may include a library module that a complier uses to add a new function through a programming language while the application 1470 is running. The runtime library 1435 may perform a function on input/output management, memory management, or an arithmetic function.

The application manager 1441, for example, may mange the life cycle of at least one application among the applications 1470. The window manager 1442 may manage a GUI resource used in a screen. The multimedia manager 1443 may recognize a format for playing various media files and may encode or decode a media file by using the codec corresponding to a corresponding format. The resource manager 1444 may manage a resource such as a source code, a memory, or a storage space of at least any one of the applications 1470.

The power manager 1445, for example, may operate together with a basic input/output system (BIOS) to manage the battery or power and may provide power information necessary for an operation of the electronic device. The database manager 1446 may create, search, or modify a database used in at least one application among the applications 1470. The package manager 1444 may manage the installation or update of an application distributed in a package file format.

The connectivity manger 1448 may manage a wireless connection such as Wi-Fi or Bluetooth. The notification manager 1449 may display or notify an event such as arrival messages, appointments, and proximity alerts to a user in a manner of not interrupting the user. The location manager 1450 may manage location information on an electronic device. The graphic manager 1451 may manage a graphic effect to be provided to a user or a user interface relating thereto. The security manager 1452 may provide various security functions necessary for system security or user authentication.

According to an embodiment of the present disclosure, when an electronic device (for example, the electronic device 100) includes a phone function, the middleware 1430 may further include a telephony manager for managing a voice or video call function of the electronic device. The payment manager 1454 may relay information for payment from the application 1470 to the application 1470 or the kernel 1420. Information associated with payment received from an external device may be stored in the electronic device or information stored therein may be delivered to an external device.

The middleware 1430 may include a middleware module for forming a combination of various functions of the above-mentioned components. The middleware 1430 may provide a module specialized for each type of OS to provide differentiated functions. The middleware 1430 may delete part of existing components or add new components dynamically.

The API 1460 (for example, the API 143), for example, as a set of API programming functions, may be provided as another configuration according to OS. For example, in the case of android or iOS, one API set may be provided for each platform and in the case Tizen, at least two API sets may be provided for each platform.

The application 1470 (for example, the application program 144) may include at least one application for providing functions such as a home 1471, a dialer 1472, an short message service (SMS)/Multimedia Messaging Service (MMS) 1473, an instant message (IM) 1474, a browser 1475, a camera 1476, an alarm 1477, a contact 1478, a voice dial 1479, an e-mail 1480, a calendar 1481, a media player 1482, an album 1483, a clock 1484, a payment 1485, health care (for example, measure an exercise amount or blood sugar), or environmental information provision (for example, provide air pressure, humidity, or temperature information).

According to an embodiment of the present disclosure, the application 1470 may include an application (hereinafter referred to as "information exchange application" for convenience of description) for supporting information exchange between the electronic device (for example, the electronic device 100) and an external electronic device (for example, the electronic devices 102 and 104). The information exchange application, for example, may include a notification relay application for relaying specific information to the external device or a device management application for managing the external electronic device.

For example, the notification relay application may have a function for relaying to an external electronic device (for example, electronic devices 102 and 104) notification information occurring from another application (for example, an SMS/MMS application, an e-mail application, a health care application, or an environmental information application) of the electronic device. The notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 102 and 104) communicating with the electronic device, an application operating in the external electronic device, or a service (for example, call service or message service) provided from the external device.

According to an embodiment of the disclosure, the application 1470 may include a specified application (for example, a health care application of a mobile medical device) according to the property of an external electronic device (for example, the electronic devices 102 and 104). According to an embodiment of the present disclosure, the application 1470 may include an application received from an external electronic device (for example, the server 106 or the electronic device 102 or 104). According to an embodiment of the disclosure, the application 1470 may include a preloaded application or a third party application downloadable from a server. The names of components in the program module 1410 according to the shown embodiment may vary depending on the type of OS.

Various embodiments in this specification may improve a normal operation and quality deterioration of a wireless communication interface by minimizing or removing interference between a USB communication interface operation and a wireless communication interface operation.

Besides that, various effects derived through the specification may be provided.

According to various embodiments of the present disclosure, at least part of the program module 1410 may be implemented with software, firmware, hardware, or a combination thereof. At least part of the program module 1410, for example, may be implemented (for example, executed) by a processor (for example, the processor 120). At least part of the program module 1410 may include a module, a program, a routine, sets of instructions, or a process to perform at least one function, for example.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). A program instruction may include high-level language code executable by a computer using an interpreter in addition to machine code created by a complier. The hardware device may be configured to operate as at least one software module to perform an operation of various embodiments and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Some operations may be executed in a different order or may be omitted. Or, other operations may be added. Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

According to various embodiments of the present disclosure, a storage medium stores computer readable instructions, and the computer readable instructions may be set to execute a USB communication function, receive an execution request for the wireless communication function during the execution of the USB communication function, and deactivating the USB communication function. Besides that, instructions for performing the above-mentioned various methods may be further stored in the storage medium.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). A program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory; and
    at least one processor connected to the memory and configured to execute at least one instruction stored in the memory,
    wherein, when a request for execution of a wireless communication function is received during execution of a universal serial bus (USB) communication function, the at least one instruction executed by the at least one processor is configured to:
        obtain a type of the USB communication function, and
        deactivate the execution of the USB communication function or maintain the execution of the USB communication function according to the type of the USB communication function.

2. The electronic device of claim 1,
    wherein, when a transmission speed of the USB communication function is greater than a specified transmission speed, the at least one instruction executed by the at least one processor is configured to deactivate the USB communication function according to the request for the execution of the wireless communication function, or
    wherein, when the transmission speed of the USB communication function is less than the specified transmission speed, the at least one instruction executed by the at least one processor is configured to maintain the USB communication function according to the request for the execution of the wireless communication function.

3. The electronic device of claim 1, wherein, when the USB communication function is a USB display data transmission function for transmitting an image, the at least one instruction executed by the at least one processor is configured to deactivate the USB communication function based on the request for the execution of the wireless communication function.

4. The electronic device of claim 1, wherein, when the wireless communication function is terminated, the at least one instruction executed by the at least one processor is configured to re-execute the deactivated USB communication function or output a deactivated USB communication function list.

5. The electronic device of claim 1, wherein, when at least one of a connection request associated with the wireless communication function execution, a user input associated with the wireless communication function execution, or a setting request associated with the wireless communication function is received, the at least one instruction executed by the at least one processor is configured to deactivate the USB communication function.

6. The electronic device of claim 1, wherein, when the wireless communication function is terminated, the at least one instruction executed by the at least one processor is configured to check a USB connection of an external electronic device, and when the USB connection is maintained, re-execute the deactivated USB communication function.

7. The electronic device of claim 1, wherein, when the wireless communication function is terminated, the at least one instruction executed by the at least one processor is configured to check a USB connection of an external electronic device, and when the USB connection is released, output a deactivated USB communication function list.

8. The electronic device of claim 1, wherein, when the request for execution of the wireless communication function occurs, the at least one instruction executed by the at least one processor is configured to output a screen for selecting whether to maintain or deactivate the USB communication function.

9. The electronic device of claim 1, wherein, when the wireless communication function execution request occurs, the at least one instruction executed by the at least one processor is configured to output guide information for guiding the deactivation of the USB communication function.

10. The electronic device of claim 1, further comprising a USB interface for supporting an external electronic device connection.

11. The electronic device of claim 10, further comprising a control switch configured to be electrically connected to the at least one processor and perform at least one of signal transmission or signal reception with the USB interface.

12. The electronic device of claim 1, wherein the at least one processor comprises:
a wireless communication function processor configured to process the wireless communication function and an application processor configured to process the USB communication function; or
an integrated processor configured to process the wireless communication function and the USB communication function.

13. An electronic device operating method comprising:
executing, by the electronic device, a universal serial bus (USB) communication function;
receiving, by the electronic device, a request for execution of a wireless communication function during the execution of the USB communication function;
obtaining a type of the USB communication function; and
deactivating, by the electronic device, the execution of the USB communication function or maintaining the execution of the USB communication function according to the type of the USB communication function.

14. The method of claim 13, further comprising executing the wireless communication function after the deactivating of the USB communication function.

15. The method of claim 13, wherein the deactivating of the USB communication function comprises:
checking whether a transmission speed of the USB communication function is greater than a specified transmission speed;
deactivating the USB communication function according to the request for execution of the wireless communication function in response to the USB communication function being greater than the specified transmission speed; and
maintaining the USB communication function according to the request for execution of the wireless communication function in response to the USB communication function being less than the specified transmission speed.

16. The method of claim 13, wherein the deactivating of the USB communication function comprises:
checking whether the USB communication function is a USB display data transmission function for transmitting an image; and
when the USB communication function is the USB display data transmission function, deactivating the USB communication function according to the wireless communication function execution request.

17. The method of claim 13, further comprising:
receiving an event associated with a wireless communication function termination; and
re-executing the deactivated USB communication function according to the wireless communication function termination or outputting a deactivated USB communication function list.

18. The method of claim 13, wherein the deactivating of the USB communication function comprises:
receiving a request corresponding to at least one of a wireless communication function execution related connection request, a wireless communication function execution related user input, or a wireless communication function execution setting related request; and
deactivating the USB communication function according to the request.

19. The method of claim 13, further comprising:
receiving an event associated with a wireless communication function termination;
checking a USB connection of an external electronic device; and
when the USB connection is maintained, re-executing the deactivated USB communication function or when the USB connection is released, outputting a deactivated USB communication function list.

20. The method of claim 13, further comprising at least one of:
when the wireless communication function execution request occurs, outputting a screen for selecting whether to maintain or deactivate the USB communication function; or
when the wireless communication function execution request occurs, outputting guide information for guiding the deactivation of the USB communication function.

* * * * *